Dec. 18, 1928.

P. P. LA MONTAGNE 1,695,734

KNITTING MACHINE

Filed Aug. 19, 1921

Inventor.
Patrick P. LaMontagne
by Heard Smith & Tranant.
Attys.

Dec. 18, 1928.　　　　　　　　　　　　　　　　　　　1,695,734
P. P. LA MONTAGNE
KNITTING MACHINE
Filed Aug. 19, 1921　　　　　9 Sheets-Sheet 2

Inventor.
Patrick P. La Montagne
by Heard, Smith & Tennant
Attys.

Inventor.
Patrick P. LaMontagne

Dec. 18, 1928.  1,695,734
P. P. LA MONTAGNE
KNITTING MACHINE
Filed Aug. 19, 1921   9 Sheets-Sheet 5

Inventor.
Patrick P. LaMontagne
by Beard Smith & Dumont
Attys

Dec. 18, 1928.
P. P. LA MONTAGNE
1,695,734
KNITTING MACHINE
Filed Aug. 19, 1921   9 Sheets-Sheet 6
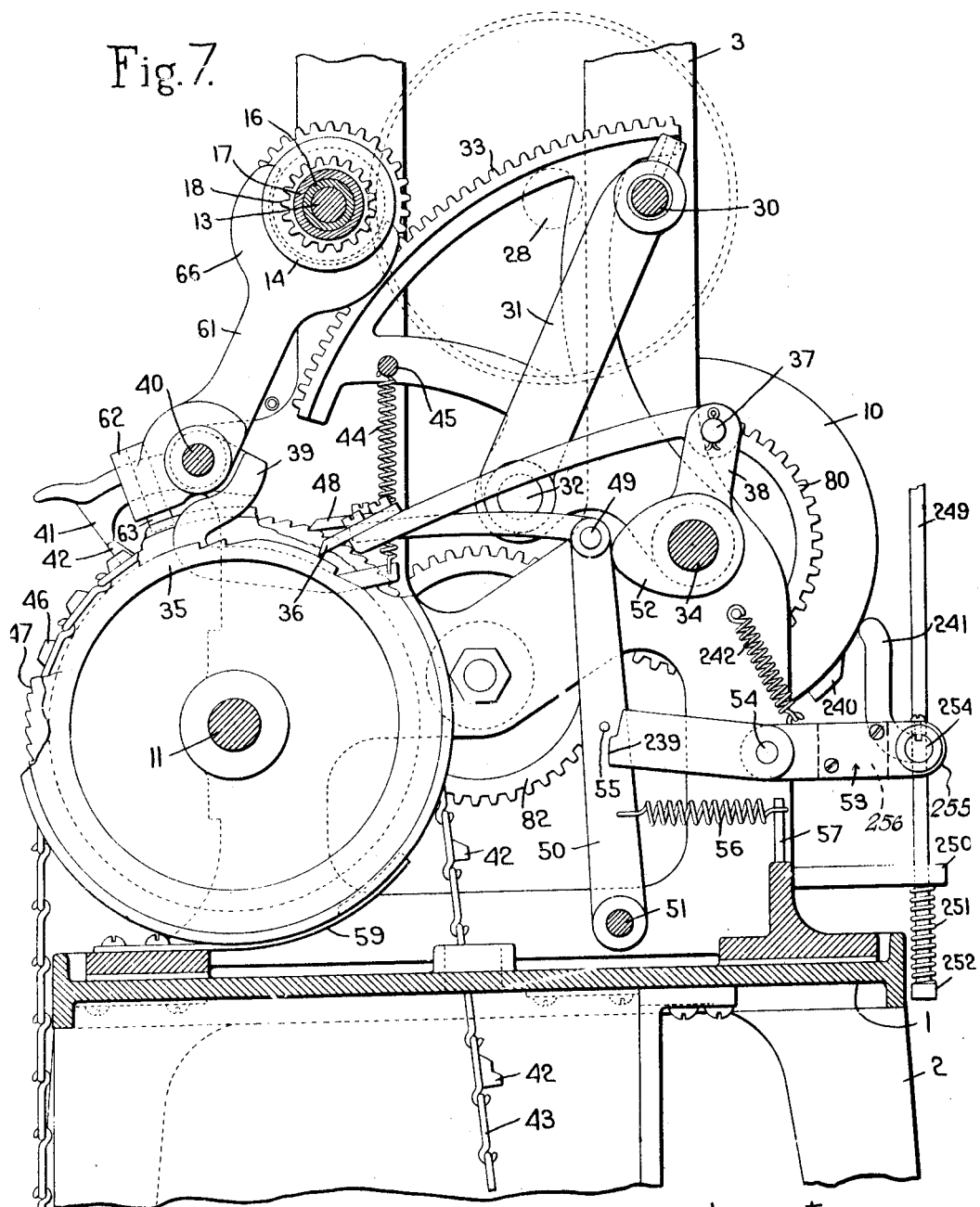
Inventor.
Patrick P. La Montagne
by Heard Smith & Tennant.
Attys.

Dec. 18, 1928.
P. P. LA MONTAGNE
1,695,734
KNITTING MACHINE
Filed Aug. 19, 1921
9 Sheets-Sheet 7
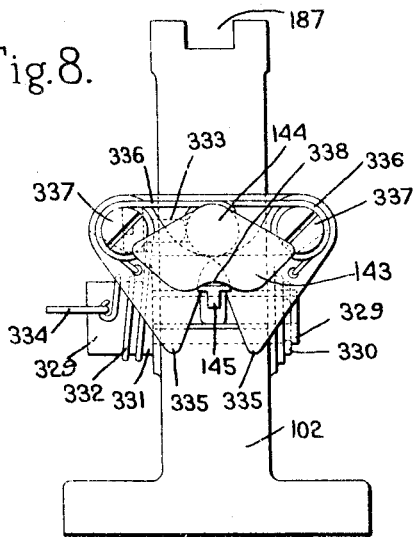
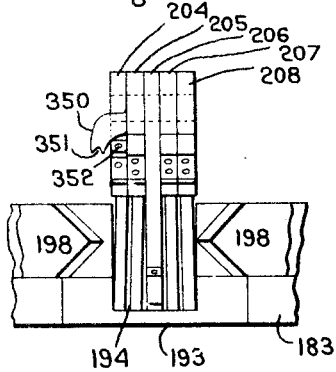
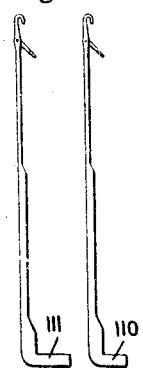
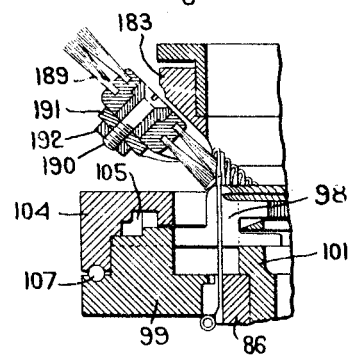
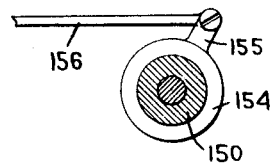
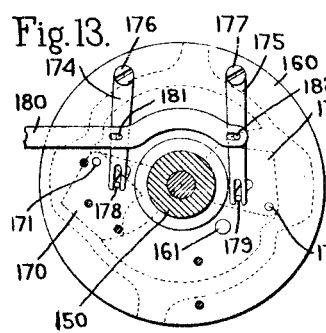
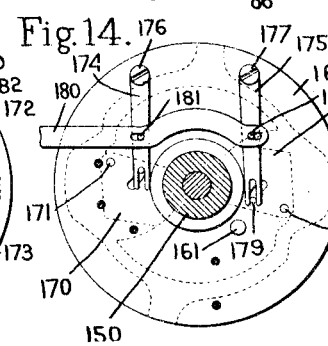
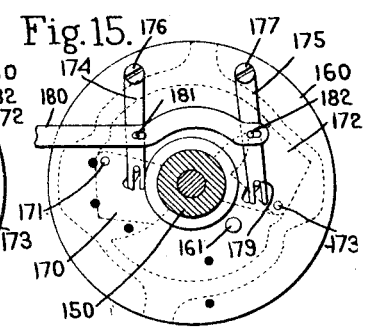
Inventor.
Patrick P. LaMontagne
by Heard Smith & Tennant
Attys.

Dec. 18, 1928.
P. P. LA MONTAGNE
KNITTING MACHINE
Filed Aug. 19, 1921
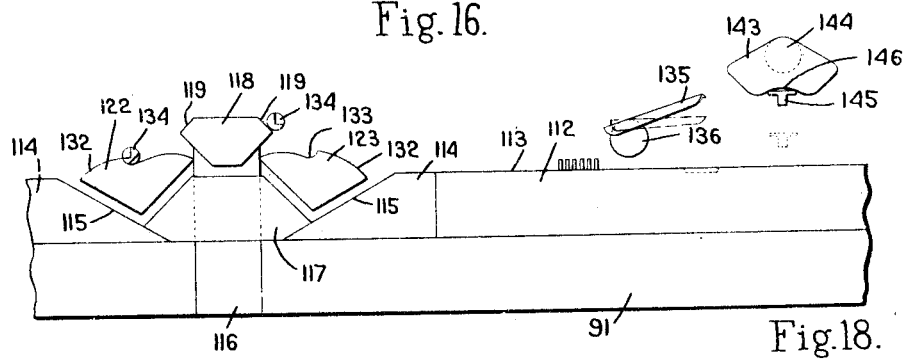
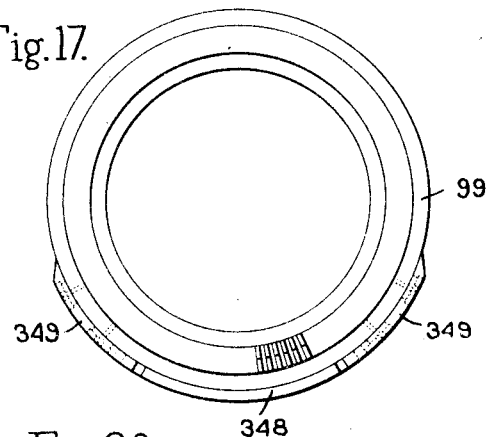
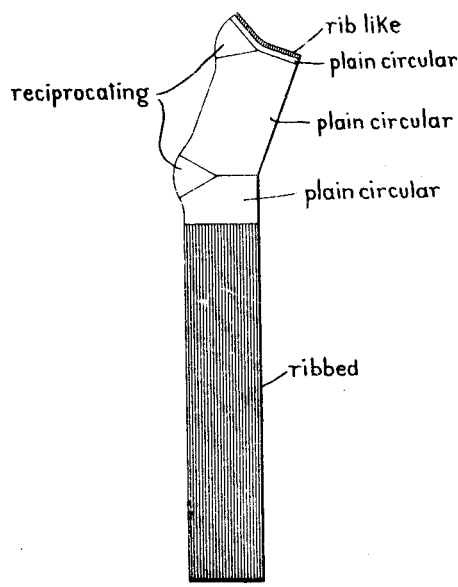
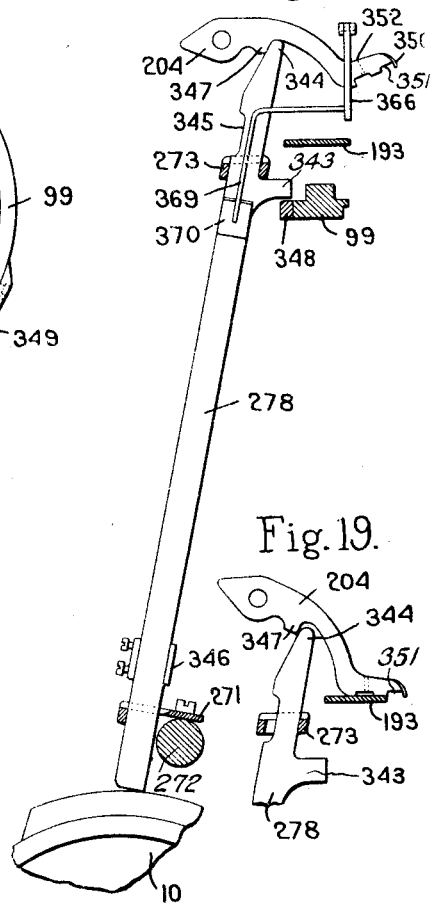
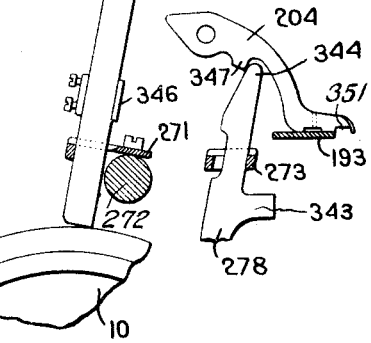
Inventor.
Patrick P. La Montagne
by Heard, Smith & Tennant
Attys.

Dec. 18, 1928.

P. P. LA MONTAGNE 1,695,734

KNITTING MACHINE

Filed Aug. 19, 1921

Inventor.
Patrick P. La Montagne
by Heard Smith & Tennant
Attys.

Patented Dec. 18, 19.8.

1,695,734

UNITED STATES PATENT OFFICE.

PATRICK P. LA MONTAGNE, OF BOURBONNAIS, ILLINOIS, ASSIGNOR, BY MESNE ASSIGNMENTS, TO POPE MACHINE COMPANY, OF KANKAKEE, ILLINOIS, A CORPORATION OF ILLINOIS.

KNITTING MACHINE.

Application filed August 19, 1921. Serial No. 493,595.

This invention relates to circular knitting machines particularly for the knitting of hosiery.

The object of the invention is to provide a circular knitting machine having both cylinder and dial needles and capable of knitting plain circular, reciprocating, and ribbed work, and having the needle cylinder and dial revolvable, thus to secure the advantages of a revolving cylinder machine in the knitting of a complete ribbed leg stocking.

The object of the invention is further to provide a knitting machine of the revolving cylinder type capable of knitting automatically ribbed leg stockings from toe to top in series with each stocking separated from the succeeding stocking and with the top left ready for finishing.

The object of the invention is further to provide means for preventing or eliminating so called double or multiple headers in starting plain knitting on the cylinder needles of a hosiery knitting machine.

The object of the invention is further to provide a knitting machine of the revolving cylinder type having both cylinder and dial needles and capable of knitting a complete ribbed leg stocking in which no cylinder needles are thrown out of action in making the ribbed leg, thus insuring the required elasticity in the leg portion.

The object of the invention is further to provide in a knitting machine which automatically knits a complete ribbed leg stocking means for measuring or determining the actual length of the ribbed portion of the leg and independently of the number of rounds.

The object of the invention is further to provide in a revolving cylinder machine having both cylinder and dial needles for knitting plain circular, reciprocating, and ribbed work, and in which the knitting proceeds from the toe to the top of a complete stocking, means for securing the requisite casting off tension at all times.

These and other objects and features of the invention will appear more fully from the description and drawings and will be particularly pointed out in the claims.

The drawings illustrate a preferred form of mechanism embodying the features of the invention in connection with a type of revolving cylinder knitting machine such as show in the patent to Scott, No. 1,152,850, granted Sept. 7, 1915, and reference may be made to that patent for a more full disclosure of some of the details of the machine not particularly concerned with the present invention. In illustrating the present invention some of the well known and familiar adjuncts to a knitting machine, such for example as the yarn tension device, are omitted and the details of other mechanisms, such as the particular shape and position of cam grooves and projections and ratchet teeth, are omitted or indicated more or less diagrammatically because these are readily arranged by one skilled in the art to accord with the particular piece of work desired.

In the drawings:

Fig. 7 is an enlarged detail partially in vertical cross section loking toward the right hand side of the machine showing the drives for the pattern drum and pattern chain.

Fig. 8 is a detailed elevation looking from the axis of the cylinder showing the widening picker or dropper, its bracket and cooperating devices.

Fig. 9 is an elevation looking from the axis of the cylinder showing the yarn guide throat.

Fig. 10 is a view of the long and short butt cylinder needles employed.

Fig. 11 is a view in vertical section showing the latch ring and brush wheel for controlling the needle latches.

Fig. 12 is a detail in horizontal cross section showing the connection for raising and lowering the cylinder.

Figs. 13, 14, and 15 are details in horizontal cross section taken just above the dial cam plate showing different positions of the dial cams and their operating connections.

Fig. 16 is a development of a portion of the cam-ring showing the relative positions of the stitch cams, pickers, switch cams, etc.

Fig. 17 is a top plan view of the sinker-bed showing the adjustable peripheral cam for controlling the splicing yarn-guide.

Fig. 18 is a detail view of the splicing yarn-guide and thrust-bar and the parts associated therewith for controlling the splicing yarn.

Fig. 19 is a detail of a portion of the construction shown in Fig. 18 with the parts in different position.

Fig. 20 is a diagrammatic view of a complete stocking as knit by the machine in a preferred form of this operation.

Figure 21:
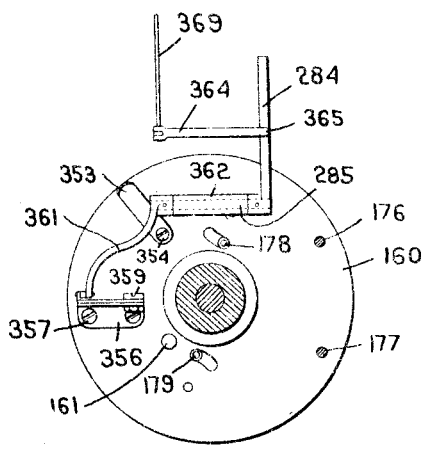

Fig. 21 is a top plan view of the dial cam bed showing the yarn clamp and cutter.

Figure 22:
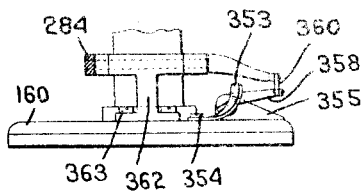

Fig. 22 is a side elevation of the parts shown in Fig. 21.

Figure 23:
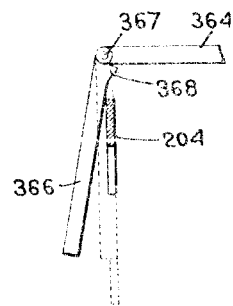

Fig. 23 is a detail showing the operative connection between the splicing yarn-guide and the cutter.

Various parts are omitted from various figures of the drawings for the purpose of clearness of illustration.

The frame of the machine is shown as comprising a stand 1 supported from the floor by four legs 2. The stand 1 carries the two vertical side frames 3 and 4, which in turn support the table 5, from which projects at the left the bed-plate 6, which forms the support for the knitting instrumentalities.

Figure 1:
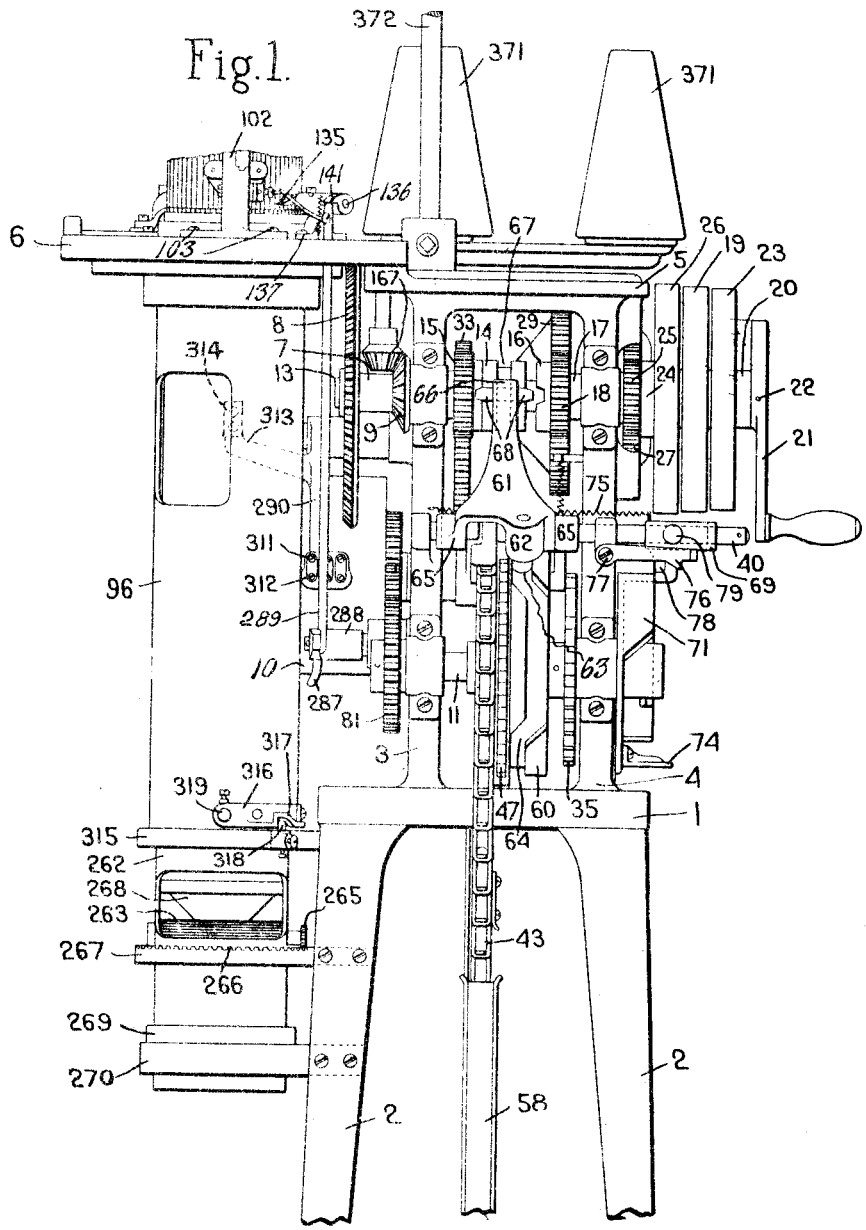
Fig. 1 is a front elevation partially broken away of the entire machine as arranged for knitting stockings.
Figure 2:
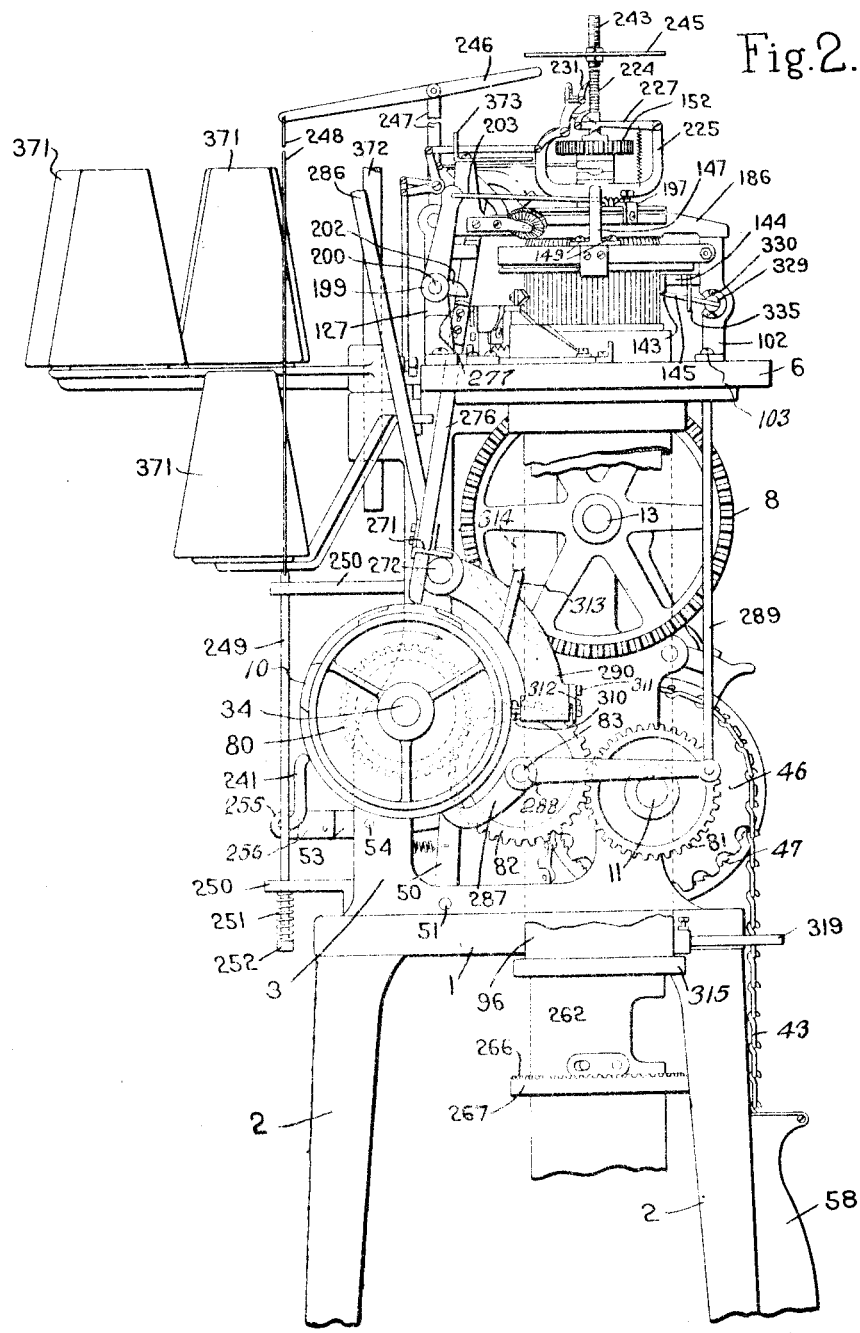
Fig. 2 is an elevation of the left hand side of the machine partially broken away but showing the mechanism above the cylinder top omitted in Fig. 1.
Figure 3:
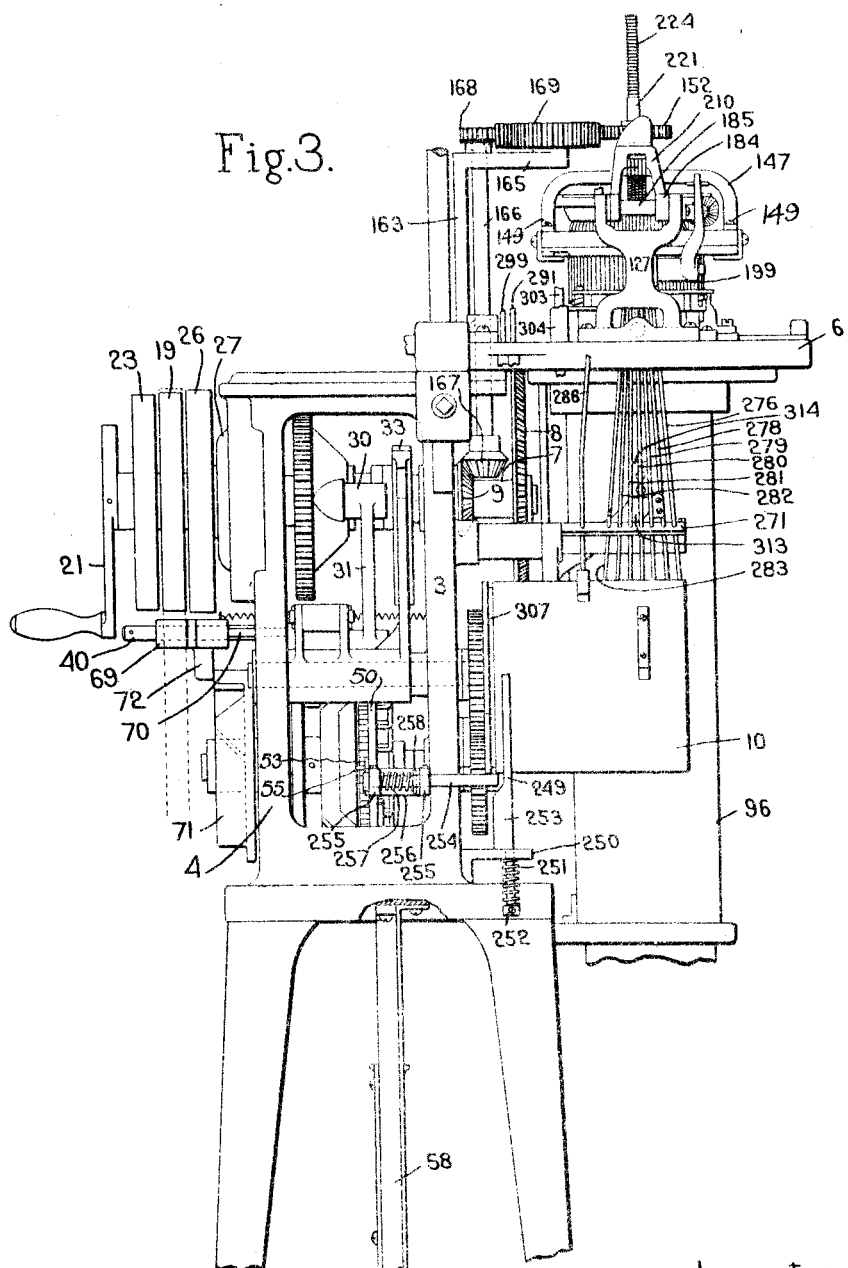
Fig. 3 is a rear elevation of the machine with some of the parts broken away.

The main driven elements from which movement is imparted to the knitting instrumentalities and from which the various mechanisms are automatically controlled are: first, the hub 7 carrying the beveled gears 8 and 9, (see Fig. 3) for revolving and reciprocating the needles according as circular or reciprocating knitting is required; second, the pattern drum 10 (see Fig. 3) which automatically controls various operations and elements to be described; third, the cam shaft 11 (see Figs. 1, 2 and 7); and fourth, the pattern chain 13 (see Figs. 1, 2 and 7). A general understanding at the outset of these elements and the means by which they are operated is desirable.

The hub 7 carrying the beveled gears 8 and 9 is secured to the left end of the main shaft 13 actuated through a clutch-collar 14 splined to the shaft 13. This clutch-collar may be thrown to the left, as shown in Fig. 1, to engage an otherwise loose reciprocable gear 15 mounted on the shaft 13 or to the right to engage the face of a tubular sleeve 16 which is journaled freely in a long bushing 17 fast in the right hand side frame 4. This sleeve 16 carries a fixed pinion 18 and a fixed pulley 19. The hub 20 of the pulley 19 may have secured thereto a hand crank 21 and be fastened to the sleeve 16 by a pin 22. A loose pulley 23 is mounted on the hub 20 of the pulley 19. The shaft 13 is reduced at its right hand end to find a bearing within the sleeve 16 and may extend past the side frame 4. The bushing 17 has rotatably mounted thereon a sleeve 24 carrying at the left hand end the pinion 25 and at the right hand end the pulley 26. The pinion 25 meshes with a gear 27 fixed to a crank shaft 28 journaled in the side frame 4 and carrying fixed thereto at the left a gear 29 having a crank pin 30. This gear 29 meshes with the pinion 18 on the sleeve 16.

When the pulley 19 is driven, the pinion 18 is driven directly at the same speed. When the pulley 26 is driven, it drives the pinion 18 at a speed determined by the gear train 25, 27, 29 and 18, thus enabling the pinion 18 to be driven at an increased speed. Thus, the hub 7 with the driving beveled gears 8 and 9 may be rotated at different desired speeds according as the belt is on the pulley 19 or the pulley 26.

The reciprocatory or oscillatory movement of the hub to obtain reciprocating knitting is secured when the clutch-collar 14 is in engagement with the reciprocal gear 15 (see Fig. 1). The crank pin 30 is connected by a pitman 31 and pin 32 with a sector 33 meshing with the reciprocating gear 15 and mounted on a sector shaft 34 at the back of the machine below the main and crank shafts. The radius of the path of travel of the pins 30 and 32 (see Fig. 3) is such as to cause a reciprocation of the gear 15 and, consequently, of the gears 8 and 9 through one complete rotation in each direction. The drive during such reciprocation is usually from the pulley 19 but the speed of reciprocation may be increased by driving from the pulley 26. The gear train for reciprocating knitting is more fully shown in the aforesaid Patent No. 1,152,850.

The means employed for shifting the clutch-collar 14 to cause the continuous rotation or reciprocation of the hub 7 and its connected gears and the means to effect the shifting of the driving belt between the loose and the fast pulleys will be described later.

The pattern cam shaft 11 (see Fig. 7) is mounted in the side frames 3 and 4 and is driven by a rack-wheel 35 fast thereon having irregular teeth engaged and advanced by a pawl 36 carried by a pin 37 in a crank-arm 38 integral with the sector 33. The wheel 35 may not advance at all times without performing too short a cycle in the motion of the shaft 11 and to permit its intermitting movement the pawl 36 is prevented from entering any tooth of the wheel 35 or is selectively permitted to engage a short tooth only, if a short tooth is the next tooth to be actuated, by means of a pawl controller 39. This controller is journaled or fulcrumed on the rod 40 and on its forward arm is provided with a lug 41 to co-operate with the pattern lugs 42 of the pattern chain 43. The rearward arm of the pawl controller has a curved upper bearing surface for the toe of the pawl 36 and a spring 44, connecting the rear end of the controller to a pin 45 projecting from the right hand side frame 4, acts to maintain the forward end of the pawl controller in engagement with the pattern chain.

The pattern chain 43 (see Fig. 7) rides on a sprocket-wheel 46 integral with a ratchet-wheel 47 loosely journaled on the shaft 11. The ratchet-wheel 47 is advanced by a pawl 48 pivoted at 49 on the upper end of an arm 50 pivoted at its lower end 51 in the side frame 3. This pawl 48 is advanced by means of an eccentric 52 integral with the sector 33, and the short steps desirable for the advance of the pattern chain are secured by limiting the rearward movement of the pawl. This is effected by a lever 53 fulcrumed at 54 on the side frame with its forward end extending opposite a pin 55 projecting laterally from the arm 50. A helical spring 56 connecting the arm 50 to a pin 57 fastened on the frame maintains the arm 50 in contact either with the eccentric 52 or the forward end of the lever 53.

The pattern chain 43 controls the pawl controller 39 to determine the times at which the pawl 36 may engage the rack-wheel 35 and advance the cam shaft 11. For this purpose the pattern chain carries suitable pattern lugs 42 of different heights and dimensions, the highest one of which determines the maximum rocking movement of the pawl controller 39 and permits the pawl, the toe of which is wide enough to straddle the rack-wheel 35 and the pawl controller, to enter upon the rack-wheel at the most withdrawn part of its forward and backward stroke to take into the longest tooth upon the rack-wheel.

The general construction of the pattern chain 43 and the chain trough or holder 58 may be substantially as disclosed in the aforesaid patent to Scott.

Backlash or overthrow of the rack-wheel or ratchet-wheels and their attachments may be prevented by providing suitable friction brakes, one of which 59 is shown in Fig. 7.

A cam-drum 60 (see Fig. 1) mounted upon the cam shaft 11 determines the movements of the clutch-collar 14. For this purpose a short, strong and rigid slide 61 is mounted to slide on the rod 40 parallel with the shaft 11 and the shaft 13. This rod 40 is rigidly mounted on the front face of the frames 3 and 4. The slide 61 is provided with a boss 62 having therein a cam-follower in the shape of a hardened roll 63 riding in the cam-track 64 of the cam 60. Separated depending bosses 65, fitting upon the rod 40, permit operative movement of the slide. At its upper end this slide 61 terminates in a clutch-fork 66 engaging a peripheral groove 67 in the clutch-collar 14. The clutch-collar is provided with tenons 68 co-operating respectively with corresponding depressions in the reciprocating gear 15 and depressions in the face of the sleeve 16 of the gear 18.

The right hand end of the rod 40 (see Fig. 1) is extended sufficiently to form a slide-bearing for a belt-shipper 69 which is further guided upon a pin 70 held parallel with the rod 40 in the side frame 4. The right hand end of the cam-shaft 11 carries a cam 71 in the form of a suitably shaped peripheral flange for acting upon the depending lug 72 of the belt-shipper 69 to move the belt-shipper and shift the belt 73 from the one to the other of the pulleys 19 and 26. The cam 71 may be provided when desired with a portion 74 removably attached thereto for moving the belt-shipper 69 to an extreme right hand position to shift the belt onto the loose pulley 23 to stop the machine, but this is not used when, as usual, the machine is knitting a series of complete stockings. The belt-shipper 69 and its attachments are controlled by a spring 75, attached at one end to the shipper and at the other end to the frame, tending to hold the lug 72 on the face of the cam 71. A latch 76 pivoted at 77 on the frame engages a lug 78 on the belt-shipper when it is in its extreme position and the belt is on the loose pulley. A handle 79 is provided for manually moving the belt-shipper.

The main pattern drum 10 is hollow (see Figs. 2 and 7) and with an integral or attached gear 80 is mounted for rotation on the sector shaft 34 which is extended to the left hand side of the frame for that purpose. The cam shaft 11 is similarly extended and provided with a similar gear 81. The gears 80 and 81 mesh with an idler gear 82 mounted upon a stud 83 projecting from the frame at an intermediate point. The motions of the shaft 11 are, therefore, transmitted without change in direction or extent to the pattern drum 10.

The location of the pattern drum directly behind the axis of the needle cylinder and under the table enables a comparatively large drum to be employed and thus enables the large number of pattern indications necessary to a complicated automatic machine to be provided. It has not been attempted in the drawing herein to indicate completely the number, shape or extent of these pattern indications on the drum because they will be varied as required by the particular conditions and their location and arrangement and shape are well within the skill of a person familiar with the art.

The construction and operation of the main driven elements by which the operations of the machine are controlled will be sufficiently understood for the present from the foregoing description.

The knitting instrumentalities comprise two sets of needles. The cylinder needles employed for knitting plain circular and reciprocating work are shown as of the usual pivoted latch type. The dial needles, which primarily act in conjunction with the cylinder needles to knit ribbed work, are shown as of the separate latch type, such, for example, as shown in the patent to Pope and Randall 1,096,946, May 19, 1914 but any suitable form of needles may be employed.

The cylinder needles are held in grooves on the surface of the needle cylinder or carrier which rotates and reciprocates with respect to the actuating cams which are relatively fixed, and in the same manner the movements of the dial take place with respect to the relatively fixed dial cams.

The bed-plate 6 projecting from the left hand side of the main frame provides a bearing for the horizontal beveled gear 84 (see Fig. 6), which intermeshes with and is driven by the beveled gear 8, already described. This gear 84 rotates on a fixed vertical axis determined by the pocket in which it is seated and has its bearing in the bed-plate 6. The central part of the gear 84 is cut away to provide an opening through which the knitted web descends. A sleeve 85 integral with the gear 84 extends upwardly and the needle cylinder 86 is mounted on this sleeve, being keyed thereto at 87 to permit relative vertical movement but to cause the cylinder to rotate with the sleeve. The cylinder, which may be of any suitable construction, is shown as of a familiar built-up character in which independently removable needle guiding walls 88 are inserted in the grooves of the cylinder and held in place by a beveled collar 89. The cylinder needles are shown mounted in the grooves of the cylinder between the walls 88 and held in place by the spring bands 90.

The cam cylinder 91 is provided with a concentric horizontal flange 92 fitting in a concentric opening in the bed-plate 6 directly over the gear 84. This flange is locked in place to the bed-plate by the screws 93 and acts to retain the gear 84 in its seat.

The gear 84 with its sleeve 85 and the cam cylinder 91 are thus fixed against vertical movement. The needle cylinder 86 is, however, vertically movable to adjust the length of the stitch and for other purposes and to enable it to be removed whenever necessary from the machine. This vertical movement of the needle cylinder is secured by a plurality of hardened steel pins 94 vertically mounted in bores in the gear 84 and supporting at their upper ends the needle cylinder or the collar 89, which forms the bottom of the needle cylinder. These pins 94 rest upon and travel with the gear 84 over a ring 95 of polished steel or other suitable anti-friction material. This ring 95 is seated upon or connected to the upper end of a tubular column 96 and therewith is mounted concentrically of the axis of the needle cylinder in a bearing in a depending cylindrical flange 97 of the bed-plate 6. The column 96 and ring 95 are vertically movable through automatic means, to be described, and thus through the pins 94 act to effect the desired vertical adjustment of the needle cylinder and, consequently, of the line over which the stitches are formed during plain knitting. This is determined in the present case by the position of the upper faces of the sinkers which are preferably employed. The radially movable sinkers 98 are of a familiar type and are mounted to slide in the radial grooves of a bed 99, rigidly mounted upon the extreme upper end of the outer face of the needle cylinder upon a flange 100 having deep longitudinal grooves in line with the needle grooves to provide for the removal of the needles. The grooves of the sinker bed 99 are located midway of the needle grooves. The inner ends of the sinkers 98 are received and guided by a nosing 101 secured to the inner counterbored upper end of the needle cylinder 86.

The yarn is drawn by the needles over the upper edge of the sinkers in the usual manner, so that the upper edge of the sinkers constitutes the effective top of the cylinder. By reason of the attachment of the sinker bed 99 and nosing 101 to the cylinder 86, these parts move with the cylinder to increase or decrease the length of stitch.

A rigid upright post 102 is rigidly secured by screws 103 to the flange 92 of the cam cylinder 91 and is located centrally at the front of the machine. The sinker cam ring 104, containing the usual cam groove 105 for operating the sinkers 98 through their butts 106, rests upon the sinker bed 99. This cam ring 104 has a depending peripheral flange fitting over a concentric shoulder portion of the sinker bed 99 and the bottom of this flange rests upon a ball bearing 107 on a peripheral flange of the sinker bed. The cam ring 104 is provided at the front with lugs 108 straddling the post 102. Adjustable set screws 109 in these lugs are set up so as to have an easy sliding contact with the sides of the post. Thus, the sinker cam ring is firmly seated on the sinker bed so as to move vertically therewith and at the same time is prevented from rotation. This sinker cam ring is utilized as the support for the dial mechanism and, consequently, the ball bearing 107 is provided.
The cam ring or cylinder 91 supports and carries cams for operating the cylinder needles. These needles, as shown in Fig. 10, are of the ordinary latch type and similar excepting that about one-half of the needles are provided with short butts 110 and the other half with longer butts 111. The long butt needles, as is usual, are thrown out of action during the knitting of the heel and toe and the two sets of needles co-operate, as usual, in knitting the circular portions of the web.

Figure 5:
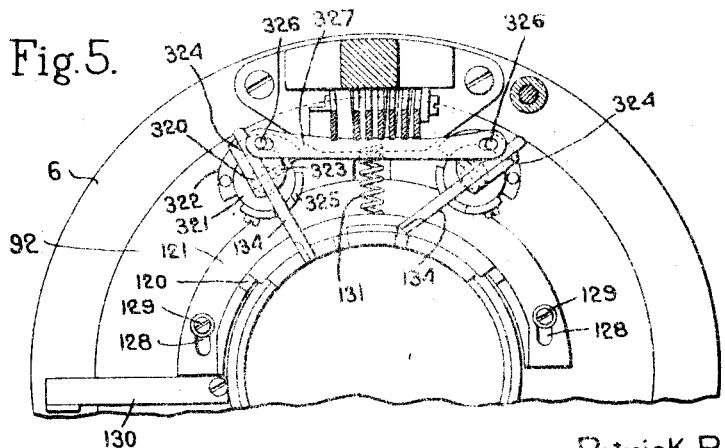
Fig. 5 is a detail partially in top plan view and partially in horizontal cross section particularly showing the picker motion.

The cam cylinder 91 is recessed or cut away at the upper portion of its inner face and in this recessed portion are mounted the hardened steel cams. The arrangement of the cams is shown in a general way in the development illustrated in Fig. 16. The main section 112 of the cam presents a straight upper edge 113 upon which the butts of all the needles at the time in action travel when they have finished their stitch forming movement. The cam sections 114 are fitted in the recess in the cam cylinder 91 at the rear and present the usual oppositely disposed slopes 115 to return to the edge 113 the butts of any depressed needles. Between these cam sections the cylinder 91 is cut away and midway of the cut-away portion is rigidly mounted in the cylinder a vertical standard 116 upon which a bottom center cam 117 and a top center cam 118 are mounted with their inner faces flush with the inner faces of the other cam sections. The cam 118, as usual, is flat at the top and provided with the slopes 119 to guide the needle butts lifted above the normal level. Surrounding substantially the rear half of the cam cylinder 91 there is mounted a segment 120 having a base flange 121 and this segment serves as a carriage for the stitch cams 122 and 123. When the knitting operations are being performed, this segment is in the position shown in Fig. 5, fitting closely against the periphery of the cam cylinder 91 and resting at its base upon the upper face of the flange 92. The segment is movable radially and is guided in its movement by a gib 124, taking into a radial slot 125 in the flange 92 and under a lug 126 of the post 127 which extends vertically up from the bed-plate 6 at the rear. The segment is further guided by slots 128 formed therein and through which set screws 129 pass into the flange 92. The segment may be moved away from the needle cylinder to withdraw the stitch cams by means of a hand lever 130 pivoted on the flange 92 and is normally held up in position by a spring 131 seated at one end in the lug 126 and at the other end in the flange 120 of the segment. The stitch cams, when the segment is in normal position, also extend flush with the faces of the other cam sections and these stitch cams are provided with upper curved slopes 132 and with recesses 133 to provide resting places for the narrowing pickers 134.

The usual switch cam 135 is provided for elevating the set of needles having the longer butts to throw them out of action when the heels and toes are knit. This switch cam 135 is shown as carried by a radial spindle 136 held in the bearing block 137 on the cam cylinder flange 92. This block is provided with a cam slot 138 co-operating with a screw 139 on the spindle 136. A spring 140, connecting the spindle to the flange 92, holds the arm 141, extending laterally from the spindle, in engagement with a rod 289 passing up through a hole 142 in the bed-plate 6 and controlled by the main pattern cam. The cam slot 138 is so shaped as to give a radial movement to the spindle when it is rotated. The switch cam 135 normally stands during circular knitting in the position shown in Fig. 16 and extends over the butts of all the needles. When reciprocating knitting is to begin and the rod is lowered, the cam 135 withdraws radially and at the same time its point is depressed so as to cause it to engage the butts only of the long butt needles. Hence, in its inner position the switch cam will slide into position to be caught by the stitch cam needles of both lengths of butts, while in its outer position it will elevate the long butt needles to a plane where they will be caught and carried above the top center cam 118.

A guide cam 143 is mounted on a stem 144 in the post 102 and this cam acts to position the butts of the needles at their upper idle level so as to co-operate with the widening picker 145, housed, when it is set for the actuation of the next needles, to encounter it in a notch 146 in the under-side of the cam 143.

The dial needles, which, as already noted, are indicated as of the separate latch type and which co-operate with the cylinder needles to make ribbed work, are supported, as already noted, from the sinker cam ring 104. For this purpose an arch 147, carrying a central hub bearing 148, is fastened at its lower flanged opposite ends by screws 149 to the top face of the sinker cam ring 104 at diametrically opposite points. A vertical sleeve 150 is mounted in the bearing hub 148 and is provided above the hub with a gear 152 pinned thereto. In order to provide for the necessary raising and lowering of the dial with respect to the cylinder, a cam mechanism is provided between the gear 152 and the hub 148. For this purpose a collar 153, having a top cam surface, is secured to the hub 148 and a co-operating collar 154, having a lower cam surface, is mounted on the sleeve and provided with a radially projecting arm 155 (see Fig. 12). A link 156, extending to the arm 155 and operated from the pattern drum, enables the collar 154 to be shifted rotarily with respect to the collar 153, thus raising or lowering the sleeve 150 and the parts connected thereto. A radial grooved dial bed 157 is rigidly secured to the bottom of the sleeve 150, as by screws 158 and in the grooves of the dial bed are mounted for reciprocation the separate latch dial needles 159.

Figure 4:
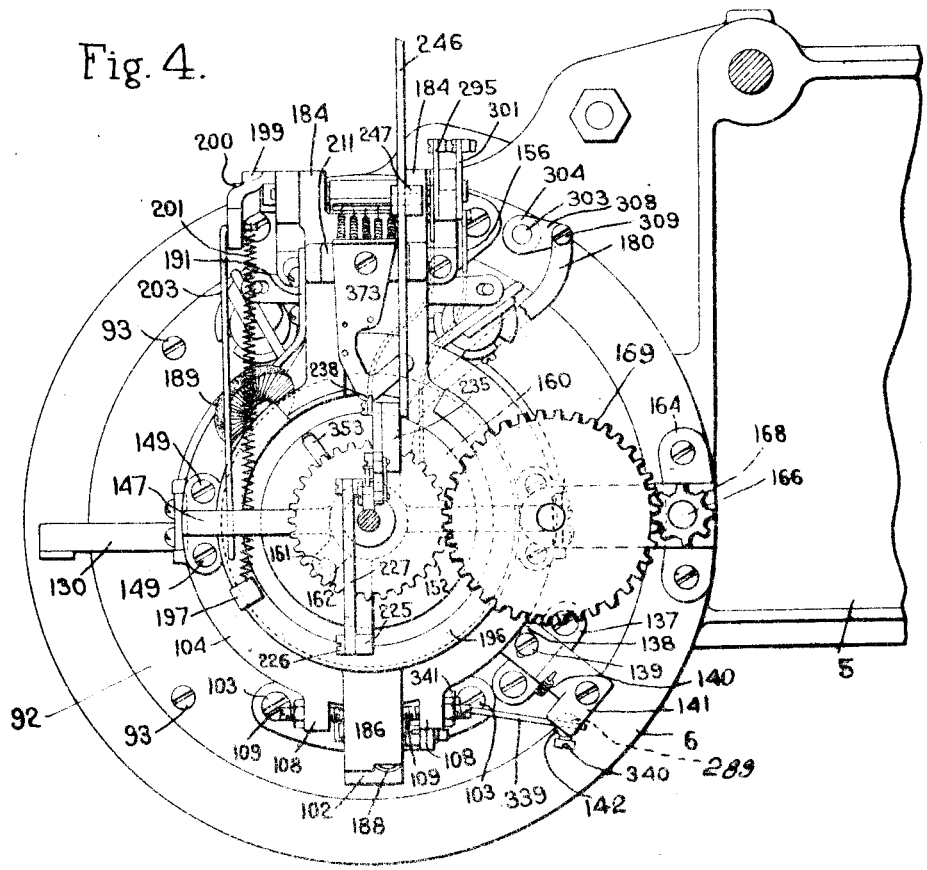
Fig. 4 is a top plan view.

The dial cam plate 160 (see Figs. 4 and 6), on the lower face of which are mounted the dial cams, is held against rotary movement in any suitable manner, as by means of a pin 161 extending vertically therefrom and sliding in a lug 162 projecting radially from the hub 148. This cam plate 160 is preferably seated against the bottom of the shoulder 151 of the sleeve 150.

Rotation of the dial bed 157 with the dial needles in synchronism with the cylinder 86 and the cylinder needles is secured in the form illustrated by a gear train extending from the gear 152 to the beveled gear 9, already described. For this purpose a vertical bracket 163 is secured by a horizontal flange 164 to the bed-plate 6 and provided with a radially overhanging arm 165. A vertical shaft 166 journaled in this bracket carries at its lower end a beveled pinion 167, intermeshing with the gear 9, and at its upper end a gear 168, intermeshing with an intermediate gear 169, pivoted on the bracket arm 165 and in turn meshing with the gear 152. The intermediate gear is made with a wide or deep face, so as to insure intermeshing with the gear 152, whatever may be its position of vertical adjustment.

The dial cams for controlling the dial needles in the preferred form of arrangement are shown in Figs. 13, 14 and 15. These cams include two pivotally mounted sections, the stitch cam 170 pivoted at 171 and the casting-off cam 172 pivoted at 173. For reasons which will appear in the description of the operation of the machine, these cams are so arranged that either may be projected while the other is retracted, as shown in Figs. 13 and 15, or both may be retracted, as shown in Fig. 14. For this purpose levers 174 and 175 are pivoted at 176 and 177 respectively on the top of the dial cam plate 160 and are slotted at their ends to engage pins 178 and 179 projecting respectively from the stitch cam 170 and the casting-off cam 172 through slots in the cam plate. These levers are operated by a rod 180 from the pattern cam. The rod 180 is in slotted engagement with pins 181 and 182 extending respectively from the levers 174 and 175, and these slots and pins are so arranged that the required movements of the two cams take place when the rod 180 is shifted in the one direction or the other.

The posts 127 and 102 (see Fig. 6), which are rigidly supported at diametrical points from the bed-plate 6 as already pointed out, support the latch-guard ring for the cylinder needles. This ring is in the form of an open drum-shaped casting 183 provided with rearwardly extending arms 184 extending between the upper forked ends of the post 127 and pivoted on a stud 185 extending through said arms and provided with a forwardly extending arm or lug 186 having a positioning gib seated in a groove 187 in the top of the post 102. The latch ring may be held in its seated position by a suitable spring catch 188. Upon disconnecting the arch 147 and removing the parts supported by it, the latch ring may be swung about its pivot to enable the needle cylinder to be removed.

When the latch ring is in its normal seated position, its lower beveled edge is in a plane perpendicular to the axis of the needle cylinder, and its inner cylindrical face is concentric with the axis of the cylinder and at such a distance from the face of the cylinder needles as to prevent movement of the latches encountering it in an open or closed position. A rotary brush latch opener 189 (see Fig. 11) is mounted so that it will encounter the cylinder needles rising on the slope 115 of the cam during circular knitting. This latch opener is shown as a thin brush wheel having radial tufts mounted for rotation on a screw 190 projecting at an angle of substantially forty-five degrees to the axis of the cylinder from an arm 191, to which it is locked by a nut 192. This arm 191 is adjustably mounted upon the side of one of the arms 184 of the latch guard ring 183, which is cut away to permit the brush to contact with the cylinder needles at a point immediately above the upper part of their rise, due to following the slope 115 of the stitch cams in the direction for rotary work. This cut-out portion of the latch ring may be an enlargement of the cut usually made at this point to give the opening latches room to swing in, the unbroken wall of the latch ring extending around the needles whose butts are traveling on the ledge 113 or in a more elevated position and preventing the opening latches from closing until the needles have been lowered beyond its influence.

The latch guard ring 183 (see Fig. 9) is cut away or slotted at the rear to form a wide parallel wall slot extending centrally and radially of the cylinder, thus providing a space for the operation of the yarn guides, of which there are a number. This opening or slot extends between the arms 184 of the latch guard ring and is closed at its bottom by a throat-plate 193 forming at the intersection of the inner surfaces of the arms 184 with the inner surface of the latch ring the bottom of a rectangular throat 194 from either corner of which the yarns may pass directly to the needles traveling in the groove between the center cams 117 and 118. The gap in the latch ring at the throat 194 is made sufficiently large to accommodate the large number of yarn guides, which is characteristic of the machine.

In order to close the upper part of the gap formed by this yarn feeding throat there is provided an incomplete annulus 195 (see Fig. 6) fitting a recess in the latch ring and rotarily mounted thereon with its horizontal flange 196 held in place by a suitable clamp 197 (see Fig. 4) secured to the latch guard ring. Accordingly as this annulus is rotated in one direction or the other, one or the other of its pointed ends 198 acts to close the gap, thus providing an unbroken latch ring for those needles which are lifted during the making of the heel and toe. A bell crank lever 199 is fulcrumed on a stud 200 projecting from the left hand face of the post 127. The upper vertical arm of this bell crank lever is connected by a tension spring 201 to the latch guard ring adjacent the clamp 197, while the horizontal arm 202 of the lever is actuated by a thrust bar controlled by the pattern drum. A wire link 203 transmits the movement of the bell crank lever to the gap closer ring 195.

The yarn guides, which may be varied in number as desired, are herein shown as five in number (see Fig. 9), the left hand one 204 being for splicing yarn and the next four in order 205, 206, 207 and 208 carrying the regular yarns. These yarn guides are all in the form of levers pivotally mounted on a stud 209 (see Fig. 6) held in lugs 210 extending up from the rearward arms 184 of the latch guard ring and bridged by a cap piece 211. These yarn guides are controlled from the pattern drum.

During the knitting of the toe, foot, heel and ankle of the stocking or during the knitting of plain work on the cylinder needles when the dial is elevated and the dial needles are out of action, the required tension on the web is produced by the sinkers, but when the dial needles are thrown into action and ribbed work is knit on both sets of needles, it is necessary to provide other means for securing the requisite tension on the needles to insure casting off, and this tension must be applied evenly and uniformly around the web notwithstanding the existence of the heel and toe pockets. In order to secure this tension on the web, there is provided a tension device or grab located inside of the web which comes into action immediately ribbed work is begun. This grab mechanism is under the control of the pattern drum and a simple and preferred form of construction is illustrated.

This take-up device or grab (see Fig. 6) comprises a plurality of cam shaped bars 212 having hooked ends 213 and arranged in a circular series with the hooked ends outward about the axis of the needle cylinder. When thrown into action, these grab bars seize the web closely adjacent the knitting point and then, by reason of their weight and the weight of the parts associated with them, act by gravity to drag the web downwardly and produce the necessary tension. When the necessity for this tension has ceased, they are withdrawn from the web and restored to the upper position ready for action.

Figure 6:
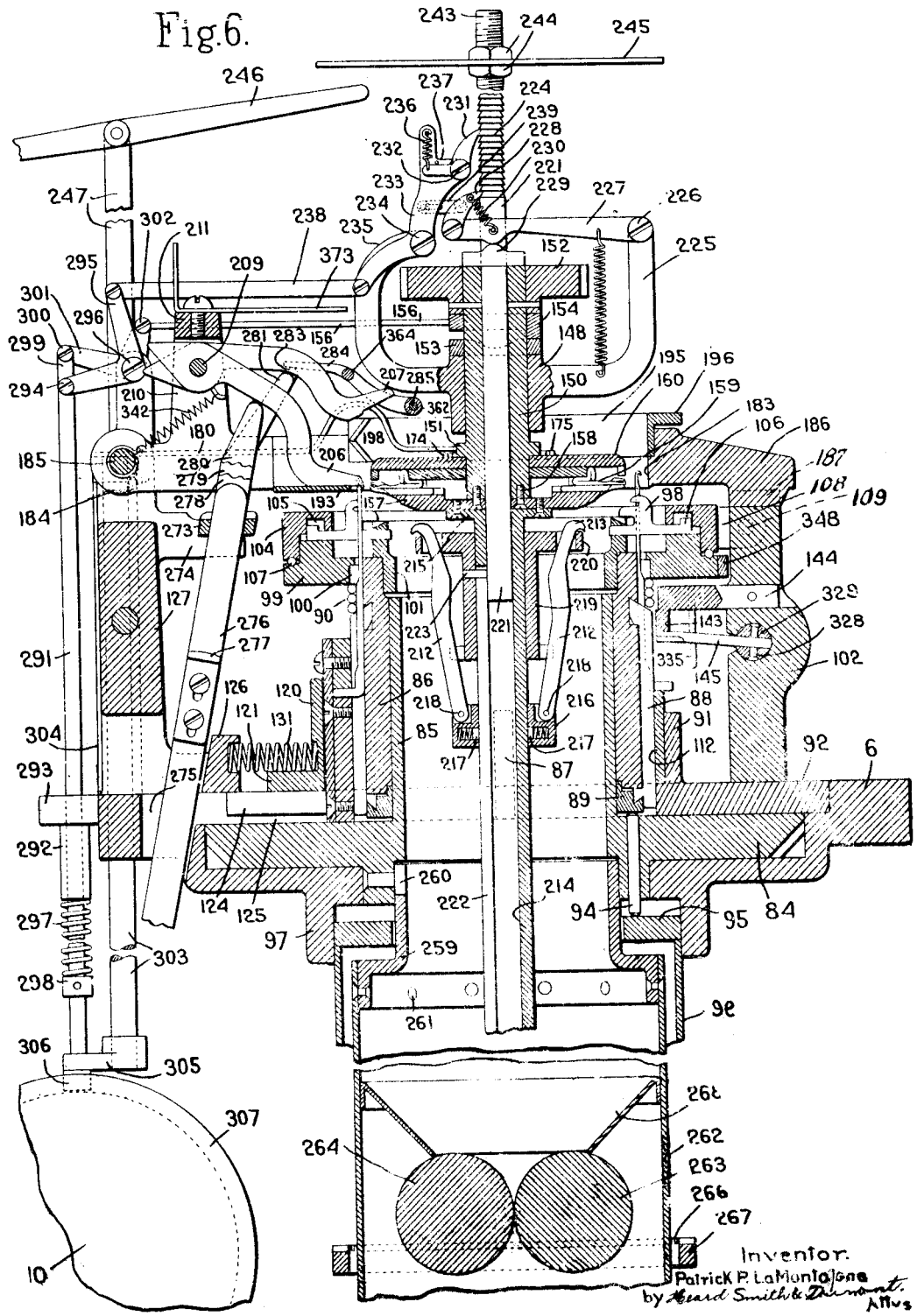
Fig. 6 is an enlarged detail in vertical cross section showing the main body of the machine and the instrumentalities particularly concerned with the formation and handling of the web.

In the form illustrated a tubular shaft 214, extending centrally down through and below the needle cylinder, is rigidly secured by a flange 215 at its upper end to the bottom of the dial bed 157. A collar 216 is mounted to slide on the shaft 214 and is held in frictional engagement therewith by spring pressed plungers 217 mounted radially therein. The grab bars 212 are pivotally mounted at 218 in this collar so as to swing radially of the axis of the cylinder. A sleeve 219 is mounted to slide on the shaft 214 and at its upper end is provided with an annular flange 220 having a circumferential series of openings therein, one for each of the grab bars 212. The construction is such that when this sleeve 219 is in its uppermost position relatively to the collar 216, as shown in Fig. 6, it rests directly under the hooks 213 of the grab bars and holds them in their innermost position. As this sleeve is slid downwardly with respect to the collar 216, owing to the cam shape of the bars 212, it swings the grab bars radially outwardly until, when the sleeve is seated on the collar 216, the grab bars are in engagement with the web. The sleeve 219 is moved by a rod 221 extending down through the sleeve 150 and shaft 214, the said shaft being slotted at 222 to permit the movement of a pin 223 by which the sleeve 219 and the rod 221 are connected. This rod 221 is automatically elevated to raise the grab to uppermost position by suitable mechanism, herein shown as a pawl and ratchet mechanism, and for that purpose the upper section of the rod is provided with circular rack-teeth 224 extending throughout the greater portion of its length. A bracket arm 225 is extended from the hub 148 of the arch 147 around the gear 152 and on this arm is pivoted at 226 a lever 227 carrying an actuating pawl 228 engaging the rack 224. The lever 227 is actuated by a cam projection or projections 229 on the upper surface of a projecting portion or collar secured to the sleeve 150. As this sleeve rotates, it will be seen that the pawl 228 will be moved up and down to engage the rack 224 and raise the rod 221. A suitable spring 230 holds the pawl 228 in engagement with the rack. A detent pawl 231 is pivoted at 232 on a lever 233 fulcrumed at 234 on another bracket arm 235 extending from the hub 148 around the gear 152. This detent pawl 231 is also held by a suitable spring 236 in engagement with the rack 224 and against a stop pin 237. The lever 233 is operated by a bar 238 from the pattern drum to swing the upper end of the lever 233 outwardly and thus disengage the detent pawl 231 from the rack 224 and also disengage the actuating pawl 228 by reason of a slotted link connection 239 with the actuating pawl.

In Fig. 6 the grab is shown in its elevated position. The actuating and detent pawls, while continuing their movement, have no further effect to elevate the rod 221 above this position. When it is desired that the grab should go into action, the pattern drum acts to give a thrust to the rod 238, thus withdrawing both pawls from engagement with the rack 224. As the rod 221 and the parts connected with it are comparatively heavy, the rod slides down by gravity, thus sliding the sleeve 219 down and camming out the bars 212 until the sleeve 220 seats on the collar 216 when all the parts slide down as the web is knit, producing the necessary tension on the web. When it is desired to release the grab, the bar 238 moves outwardly under the control of the pattern drum and the pawls 228 and 231 begin at once to raise the rod 221. The first action is to raise the sleeve 219 with respect to the collar 216, thus camming in and withdrawing the grab rods 212 from the web thereafter, as the flange 220 of the sleeve 219 contacts with the hooks 213 of the grab rods, the entire mechanism rises until it reaches its uppermost position, as shown in Fig. 6.

It is important in knitted articles, especially those that are used for wearing apparel, such as stockings, that the dimensions shall be as accurate as possible. Stockings, for example, vary in lineal measurement between the various sizes only a comparatively small amount. It is difficult to obtain the same length of web in a plurality of articles knitted although the number of courses knit may be precisely the same. This is due to the varying quality of yarn, to the varying tension and to various other causes which it is practically impossible to overcome. In this invention provision is made for measuring the length of the knitted web, particularly the length of the ribbed leg and controlling the change of the operation of the machine upon the completion of a predetermined measured length. This is secured by means of the grab or take-up mechanism, already described, but of course, may be secured by other suitable means.

In the machine, as already described, the pattern chain 43 is running continuously and when any change in the operation of the machine is to be effected, a high lug on the chain is presented to the controlling pawl 39 which acts to place the actuating pawl 36 into operative position to turn the pattern drum 10 to the new required position. In the present preferred form of construction, means are provided for suspending the operation of the pattern chain immediately after the machine has begun the operation of knitting the ribbed section of web and then restoring the pattern chain to operation upon the conclusion of the knitting of a predetermined length of ribbed web whereupon the pattern chain at once acts to effect the movement of the pattern drum to effect the necessary change in the operation of the machine. Thus, the ribbed leg is accurately measured and any number of stockings having precisely the same length of ribbed leg of the required dimensions may be knit. The specific mechanism employed is somewhat similar to that disclosed in the patent to Randall, 1,210,837, Jan. 2, 1917, but in the present case the length of travel of the grab is utilized to measure the length of the ribbed work.

It will be recalled that the lever 53 acts to restrain the rearward movement of the pawl 48 which actuates the chain driving ratchet-wheel 47. When this lever 53 is in the position shown in Fig. 7, the pawl 48 has its full movement so that at each rotation of the eccentric 52 the ratchet-wheel 47 is advanced one tooth. If, however, the lever 53 be lowered at its rear end so as to raise the projected portion 239 of its front face opposite the pin 55, the rearward movement of the pawl 48 will be limited so that it cannot catch in the next tooth and it will reciprocate with an idle restricted movement, thus stopping the rotation of the ratchet-wheel and the pattern chain. The pawl 53 is moved into position thus to stop the pattern chain by a suitable cam 240, so positioned on the pattern drum 10 that when the change to ribbed work is to be effected this cam rides beneath an arm 241 connected to the rear end of the lever 53. This causes the lever 53 to rock against the action of the spring 242, by which its rear end is connected to the frame, and to raise the forward end of the lever and bring the projected portion 239 opposite the pin 55. The pattern chain and pattern drum thereupon remain stationary during further operation of the machine and until the conclusion of the knitting of the predetermined length of ribbed work.

The rod 221 which travels downwardly with the grab is provided above its rack section 224 with a threaded section 243 and on this threaded section is adjustably clamped by means of the lock nuts 244 a disk 245 (see Figs. 2 and 6). This disk is set at such a point on the rod that the distance it travels downwardly after the sleeve 219 contacts with the collar 216 until it strikes and actuates the lever 246 shall be equal to the desired length of ribbed work. This lever 246 is fulcrumed on a post 247 extended upwardly from one of the arms 184 of the latch guard ring and at its rear end is pivoted to a connector, such as a wire 248, in turn pivoted at its lower end to a slide bar 249 mounted in bracket arms 250 projecting from the frame. This slide bar 249 is normally held depressed and, consequently, the front end of the lever 246, cooperating with the disk, is held elevated by a spring 251 surrounding the lower end of the slide bar 249 between the lower bracket 250 and a collar 252 secured to the slide bar. It will thus be seen that when the grab has traveled downwardly a predetermined distance and thus a predetermined length of knitted web has been knit, the disk 245, coming into contact with the lever 246, will raise the slide bar 249. This slide bar is provided with a cam portion 253 which is thereupon brought into engagement with a shaft 254 carrying the arm 241 to cam the arm 241 off sideways from the cam 240 on the pattern drum and allow the lever 53, under the action of the spring 212, to return to normal position, illustrated in Fig. 7, whereupon the pattern chain and pattern drum are moved to effect the change in the operation of the machine. To enable this to be done, the arm 241 is formed on or secured to the end of a shaft 254 keyed in bearing lugs 255 on a, or to a, bracket 256 formed on or attached to the lever 53. A helical spring 257 engages between the lug 255 and a pin 258 in the shaft 254 and acts normally to hold the arm 241 in the path of the cam 240. By the time the grab has been ratcheted up sufficiently to release the disk 245 from the lever 246 to allow the cam 253 to drop and the arm 241 to swing away, the cam 240 on the pattern drum will either have moved opposite or past the arm 241.

It is desirable also to provide means to seize the web when the grab is at or near its lowermost position and when the end of the knitting of the stocking has been reached or nearly reached which shall insure that the grab be drawn out of the web when it is elevated and the stocking discharged from the machine. Any suitable means may be provided for this purpose, but a simple and preferred form of device is illustrated. A bell shaped tube 259 (see Fig. 6) is riveted or bolted at 260 to a depending flange of the gear 84 so as to form a substantial continuation of the sleeve 85. To the lower end of this section 259 is riveted at 261 a long depending concentric tube 262. In this tube is journaled adjacent the horizontal axis a pair of corrugated rolls 263 and 264. These rolls are somewhat similar to the ordinary take-up rolls of a knitting machine but one of them, as 263, is provided with a shaft extending through the tube 262 and carrying a pinion 265 meshing with an annular rack 266 (see Figs. 1 and 6) formed on a bracket 267 bolted to one of the legs 2 of the frame. Above the rolls 263 and 264 a frustro conical guide 268 is secured to the tube 262 to direct the web between the rolls. Beneath the rolls the tube is provided with a collar 269 having a bearing, and preferably a ball bearing, on the annular rack 270 also bolted to the leg 2. Before or at the completion of the ribbed work the web will be directed by the guide 268 into the bite of the rolls 263 and 264 and as the tube 262 is revolving, these rolls, being rotated on their own axes, will strip the web off the grab and insure the discharge of the stocking through the lower open end of the tube. These rolls may be arranged to seize the lower end of the web well before the completion of the ribbed knitting and to feed the web slowly out so as to strip the web from the grab when the knitting of the ribbed work is completed and thus allow for functioning with any desired length of stocking.

The cam shaft 11, as already noted, carries the cam drum 60 which controls the change from rotary to reciprocating knitting and vice versa and the cam 71 which controls the change in speed and the lug 74 which may be used to effect the stopping of the machine at the end of its cycle of operation, but which is not used in the preferred operation of the machine for making a complete series of separate stockings. The grab or tension device determines the length of the ribbed work and the shift therefrom to another form of knitting. All the other operations of the machine are under the control of the pattern drum 10 which, it will be noted, is located directly in the rear of the needle cylinder and substantially in line with the axis thereof. This drum is provided with the necesary cam projections and cam grooves or other pattern indications and in most cases they are so arranged as to effect a very direct and simple application of force to effect the required changes in the operation of the machine. No attempt is made in the drawings to illustrate these various cam grooves or pattern indications in detail because they are varied more or less according to the character of work being knit and their arrangement and positioning on the drum are within the skill of a person skilled in this art.

The principal means by which the various agencies of the machine are operated from the pattern drum preferably take the form of rigid thrust bars mounted to move radially with respect to the cam drum and operated by pattern cams or lugs detachably secured to the face of the drum. The drum may obviously be made of a length suitable to provide for the required plurality of circumferential rows of such cams or lugs and these cams or lugs may be made of any requisite width. So also the shape and length of these cams or lugs and their position circumferentially of the drum will be governed by the desired timing and operation of the various agencies of the machine. The pattern drum also may operate some of the agencies through cam grooves formed therein of the required character.

The first group of actuating devices (see Figs. 3 and 6), beginning at the left hand end of the drum, is a series of seven thrust bars extending radially of the drum and inclined toward the axis of the cylinder. These thrust bars are guided rectangularly in two combs conveniently supported near the upper and lower ends of the thrust bars (see Fig. 18). The lower comb 271 is attached to a rigid stud 272 extending parallel to the drum shaft 34 from the end frame 3. The upper comb 273 is carried by lugs 274 extended forwardly from the post 127. The thrust bars pass upwardly from the drum through an opening 275 provided in the bed-plate 6 and the base of the post 127. The various thrust bars will preferably be made in the form of flat rectangular bars of tool steel and may be spaced further apart at their lower ends or otherwise diverted from parallelism to co-operate with the actuating cams on the pattern drum as viewed from the front of the machine.

Beginning at the left hand end of the drum the first thrust bar 276 controls the bell crank lever 199, already described, for shifting the gap closing ring 195. This thrust bar is provided on its side with a lug 277 adjustably secured thereto and adapted to engage the shorter arm 202 of the bell crank lever.

The second thrust bar 278 engages beneath the splicing yarn guide lever 204 forward of its fulcrum and acts, when elevated, to lift this splicing yarn guide up out of yarn feeding position and when depressed to allow this yarn guide to drop into yarn feeding position. The next four thrust bars 279, 280, 281 and 282 actuate respectively and in a similar manner four yarn guides 205, 206, 207 and 208, which are representative of any desired number.

The next thrust bar 283 actuates a lever 284 fulcrumed at 285 controlling the yarn cutter and clamp, to be described.

The next thrust bar 286 is guided in the lower comb 271 but extends up or outside of the bed plate 6 and serves to actuate a suitable yarn take-up and tension device, not shown, and which forms no part of the present invention.

The next device actuated by the pattern drum is a lever 287 having a hub 288 fulcrumed on the stud 83 and connected at its front end to a vertical rod 289 controlling the widening picker and switch cam, to be described.

The next rows of cams on the pattern drum, herein shown as three in number, although any number may be employed, are for the purpose of actuating the lever 290 for raising the needle cylinder to vary the length of stitch in a manner to be described.

The next device is a vertically arranged thrust bar 291 (see Fig. 6) having an extended vertical bearing in a sleeve 292 on a bracket 293 secured to the face of the bed-plate 6. This thrust bar at its upper end is pivoted at 294 to a bell crank lever 295 fulcrumed on a stud 296 carried by the post 127. This bell crank lever 295 is pivoted to the bar 238 which, as already described, serves to release the actuating and detent pawl for the grab rod 221. As it is necessary to maintain these pawls in engagement with the rack 244 while they are performing their functions it is desirable to assist the action of gravity in moving the thrust bar 291 downwardly; accordingly a helical spring 297 is provided surrounding the bar 291 between the sleeve 292 and a collar 298 secured to the bar.

The next device is a similar vertical thrust bar 299 similarly mounted in the bracket 293, similarly operated, and pivoted at its upper end at 300 to a second bell crank lever 301 fulcrumed on the stud 296 and in turn pivoted at its opposite end at 302 to the bar 156, already described, for operating the cam 154 for raising and lowering the dial.

The next device is a vertical shaft 303 having a vertical bearing in the bed-plate 6 and a vertical sleeve 304 extending upwardly therefrom. This shaft 303 at its lower end is provided with a crank arm 305 having a stud or roll 306 riding in a suitable cam groove 307 formed in the periphery of the drum. At its upper end the shaft carries a crank arm 308 pivoted at 309 to the bar 180, already described, for shifting the dial cams.

The next device and the last illustrated controlled by the pattern drum is the lever 241, already described, for stopping the actuation of the pattern chain.

Gravity and the forces resulting from the operation of the machine may be sufficient to maintain the engagement of the thrust bars and devices with the pattern drum and where necessary, as for example in the cases already referred to, the action of springs may be employed to maintain such engagement.

The length of the stitch employed in the knitting operation may, as already pointed out, be varied by shifting the needle cylinder vertically and thus varying the vertical distance between the stitch cams or the cylinder needles and the top edge of the sinkers over which the yarn is drawn in plain knitting or the distance between the stitch cams and the dial needles over which the yarn is drawn in ribbed knitting. In the construction illustrated this vertical shifting of the needle cylinder and the parts supported thereby is secured automatically at the required times by the action of the pattern drum through the lever 290, already referred to. This lever 290 is fulcrumed on the stud 272. Its lower end carries a plurality of plungers 310 corresponding to the circumferential rows of cam projections on the drum, herein shown as three in number. These plungers (see Figs. 1 and 2) have adjusting screws 311 and lock nuts 312 and engage the pattern cams. The upper arm of the lever 290 is curved laterally at 313 and seats beneath the under side of a lug 314 secured to the back of the tubular column 96. The lower end of the column 96 is seated in a ring bearing formed on the annular bracket 315 secured to the under side of the table 1 and is restrained from falling by the cam lug 316 secured to the column. This lug has a recess with a sloping face 317 resting on a plunger 318 vertically adjustable in the annular bearing 315. An arm 319 projects forwardly and is adapted to be operated by the knee to effect rotary movement of the column 96. Thus the length of the stitch may be varied at any time manually as desired.

The mechanism employed for narrowing and widening the back of the tubular web in order to form the toe and heel pockets and the mechanism for rendering substantially one-half of the needles, or those having the longer butts, idle is of a generally familar type. The narrowing or lifting pickers 134 (see Figs. 5 and 16) which engage and elevate the leading needles of the series of short butt needles at each stroke of the reciprocatory movement, the single widening picker 145 which engages and carries down into action the leading pair of needles of the series moving in either direction in an idle path above the stitch cam 118, and the switch cam 135 have already been referred to.

The narrowing or lifting pickers 134 are of symmetrically opposite but of like form and are placed equidistant of the center of the stitch cams at points permitting the picking instrument proper to rest in the notches 133 at the top of the leading and following stitch cams 123 and 122 in a substantially radial and horizontal position. This position for the picker is determined by the position of the vertical axis or stem 320 of the head 321 rotatably mounted in the tubular support 322 secured to the flange 92 of the cylinder cam carrier. The overhanging head 321 is vertically slotted to receive the picker 134 which is pivoted on a pin 323 in this slot. Thus, the picker is mounted for rotation in a horizontal and in a vertical plane. The outer end or tail of the picker is acted upon by a spring pressed flange 324 seated in the head 321. A cam sleeve 325 secured to the inner face of the tubular support 322 controls the vertical movement of the picker about the pivot 323. When the picker 134 is in the radial position shown at the left in Fig. 5, it rests upon a low part of the cam sleeve 325 and freely in the notch 133 of the cam. Movement of the picker about its axis 320 in a direction toward the stitch cams will cause it to ride up the cam elevation of the sleeve 325 to move on its pivot 323 and lift the needle onto one of the slopes 119 of the top center cam 118 whereupon the picker leaves the needle but by reason of its movement around the axis 320 as a center. In the head 321 of each of the pickers at the same eccentric distance from the center of the stem 320 is provided a pin 326 which serves as a crank pin for a link 327 having a slotted engagement with both pins to secure the necessary lost motion. The two pickers are thus connected so that rotation about their respective axes 320 will occur simultaneously in the same direction and to the same extent. The provision of lost motion in the slotted link 327 (see Fig. 7) is to enable the idle picker to snap down the incline of its cam 325 under the influence of the flange 324 without accelerating the movement of the active picker to disengage it from the needle butt which is moving it.

Special provision for the automatic control of the narrowing pickers is unnecessary since the idle position for said pickers is reached when the last needle has been lifted above the cam 118 in the direction for rotary work. When this position has been reached the left hand picker rests in its notch 133 ready to receive the first needle of the short butt set upon the first back stroke of the machine. The operation of the narrowing pickers thus begins upon the change in the motion of the needle cylinder and ends upon the operation of the cam 135 to restore the long butt needles to knitting position. For further details of the construction and operation of the narrowing pickers reference may be had to the aforesaid mentioned patent to Scott, 1,152,850.

The widening picker 145 (see Figs. 2, 8 and 16) is mounted for horizontal movement on a pin 328 in a slot formed axially in a short shaft 329 in a bore in the post 102 which is cut away to permit vertical movement of the picker with the oscillation of the shaft 329. This shaft is restrained from endwise movement by a cotter-pin 330 and washer at one end and a shoulder 331 at the other end. A helical spring 332 tends to rotate the shaft 328 to lift the inner end of the picker. The positioning cam 143 for the widening picker, as already noted, is mounted on the stem 144 in a bore in the post 102. The spring 332 may conveniently be attached to a set screw 333 for holding the stem 144 at one end and at the other end to an operating arm 334 projecting from the shaft 329.

In order to determine the depressing movements of the picker to one side or the other permitted by the universally jointed mounting, above described, there may be employed the radius bars or wings 335 under the influence of springs 336 surrounding the pivot screws 337 screwed into lateral extensions of the post 102. These wings present notches 338 to receive and ride downwardly the picker when struck by a needle butt moving to the right or left. The stress of springs 336 is sufficient to maintain the wings 335 in the position shown in Fig. 8, the notches 338 defining for the picker 145 a radial position, in which the picker is normally held by the spring 332 in its active or most elevated position against the positioning cam 143. A pair of needles moving in either direction having encountered the picker and moved downward in the path determined by a wing 335, the picker returns to its upper radial position by the effect of spring 332 and the notch defined by both of said wings 335.

Means are provided for moving the widening picker out of its operative position to the lower idle position during the operation of the narrowing pickers while narrowing and for thereafter moving the widening picker into its operative position for widening.

The means for controlling the switch cam from the pattern cam drum through the rod 289 have already been described. Projecting from a bore in the head of said rod 289 there is provided an arm 339 (see Fig. 4) secured by a set screw 340 and having a bent end 341 to contact with the arm 334 of the horizontal shaft 329 of the widening picker 145. The adjustment of the arms 339 and 341 is such as to cause the picker to begin to be moved upon a downward stroke of the rod 289, when the switch cam has reached the position at the end of its arc of movement opposite to that illustrated in Fig. 16. It will be apparent that further movement of the rod 289 downwardly will move the picker 145 downwardly to a position shown in dotted lines in Fig. 16 in which it cannot encounter any of the needle butts.

During circular knitting the pattern cam drum is arranged to hold the rod 289 and the point of the switch cam 135 in their most elevated positions. At this time the picker 145 rests in the notch 146 but its position is nevertheless idle since there are no needles on the upper path to encounter it. When the machine approaches the change to reciprocating knitting the pattern cam drum lowers the rod 289, thus lowering the point of the cam 135 to switch up the long butt needles. This movement occurs during the passage of the long butt needles. Consequently, the arm 339 will encounter the arm 334 of the picker shaft 328 and rotate it against the spring 332 to bring the working end of the picker 145 to a low point indicated in dotted lines in Fig. 16. The picker remains in this lower idle position until sufficient needles have been lifted by the operation of the lifting pickers to narrow the fabric whereupon the pattern cam drum acts to lift the rod 289 sufficiently to release the depressing picker 145 to the position shown in Fig. 8, but not far enough to operate the switch cam, in which position the picker will encounter and move down the first two needles of the lifted series. The narrowing pickers remain at work, but the needles are moved downwardly two at a time by the depressing picker 145 and upwardly one at a time by the pickers 134, resulting in the gradual widening of the series until all of the short butt needles have been restored to action. The pattern cam drum then acts to lift the switch cam 135 to restore the long butt needles to the active level, this operation taking place simultaneously with the shift of the machine to rotary knitting and all in a manner similar to that described in the aforesaid Patent No. 1,152,850.

The independently movable yarn guides 204, 205, 206, 207 and 208, already described, and which are pivoted on the stud 209 are preferably curved hardened steel bars so shaped that when in a lower position, which is the position in which they are operative to feed yarn to the needles, their inner ends rest upon the throat-plate 193 (see Figs. and 19), which forms the closure at the bottom of the slot between the arms 134 of the latch guard ring. In this position the heads of the yarn guides are just outside of the periphery of the needles, and yarns carried in the eyes of the yarn guides may reeve from the corners of the throat 104, to be taken by the needles. Each of said yarn guides is connected at a point inward from its pivot by a spiral spring 342 with the latch guard ring pivot stud 185. The yarn guides are thus movable by the springs 342 and their respective thrust bars into and out of their lower operative position, as determined by the pattern cam drum.

The splicing yarn guide 204 (see Figs. 18 and 19), operated by the thrust bar 278, is utilized to knit the sectional splicing of the stocking as, for example, the high splicing at the back of the heel or the reinforcement at the sole. The thrust bar 278 is provided with a lug 343 at a point beneath the comb 273 and normally above the plane of the sinker bed 99. This thrust bar 278 is also provided with a rounded nose 344, preferably further removed from the pivot 209 than the noses of the remaining thrust bars, and with a recess 345 which, when said bar is lowered, comes opposite the rear member of the comb 273. Movement of the thrust bar 278 toward the rear of the machine through a small arc is thus permitted when said bar is in its lowermost position. The bar carries an adjustable stop lug 346 for contact with the upper face of the comb 271 to provide a pivot point upon which said bar may swing through the limited arc allowed by the recess 345, whenever the cams on the pattern drum 10 permit the bar to drop to its lower position. Co-operating with the nose 344 of the thrust bar is provided upon the yarn guide 204 a cam lug 347. On the flange of the sinker bed 99 and thus rotating with the needle cylinder is located an attached cam 348 having adjustable end faces 349. When the thrust bar 278 has been permitted to drop, its lug 343 will be in the path swept by the cam 348. These cams may be adjusted or replaced by others to vary the peripheral segment desired to be sectionally spliced. Upon the passage from under the bottom end of the thrust bar 278 of one of the cams on the pattern drum 10, the yarn guide 204, which before has been held in an elevated idle position, will be permitted to drop until its inner end rests upon the plate 193, thus placing its yarn in feeding position; but upon the passage of the cam 348, the thrust bar 278 will be rocked upon the lug 346, then resting upon the lower comb 271 as a center, permitting the nose 344 in co-operation with the cam lug 347 to throw the splicing yarn guide sharply to its idle position at a predetermined needle, and upon the end of the cam 348 running off the lug 343, the spring 342 will restore the splicing yarn guide to operation at another predetermined needle. The yarn feeding end of the splicing yarn guide 204 is different from the other yarn guides in being provided with a laterally offset overhanging projection 350 to straddle the line of the needles having a notch 351 on the under side of its extreme point. This is to co-operate with the end of the splicing yarn presenting a short guided run of yarn extending from the bore 352 to said notch.

Co-operating with the yarn feeding devices there is employed a suitable yarn clamp and cutter which may be of any desired construction and which is supported and carried by the dial cam plate 160. The cutter is operated by suitable connections to the pattern cam drum so as to sever a yarn thrown out of operation and it is also operated by the splicing yarn guide to sever the splicing yarn each time this splicing yarn is thrown out of operation. A simple and preferred means for securing these results is illustrated more particularly in Figs. 21, 22 and 23. The yarn clamp comprises a thin resilient spring member 353 secured at a suitable point 354 to the dial cam plate 160 and extending radially outward and upward and in such a position that the yarn thrown out of operation will be brought beneath this clamp and pinched between it and the dial cam plate 160 and there held until it is restored to operation.

The yarn cutter comprises a fixed shearing blade and a movable shearing blade and is suitably positioned on the dial cam plate 160 so that the yarn will be brought between the blades and severed as soon after it is thrown out of operation as is possible. The fixed shearing blade 355 is shown as provided with a horizontal flange 356 secured by screws 357 to the dial cam plate 160 in such a position that the fixed blade extends radially with its outer point merging into or flush with the surface of the dial cam plate so that as the yarn is carried away from the knitting point and into the clamp 353, it will next pass up onto this fixed shearing blade. The movable shearing blade 358 is pivoted at 359 to the fixed blade and at its outer end is connected by a link 360 to one arm 361 of a bell crank lever having an extended fulcrumed bearing 285 in a standard 362 secured by screws 363 to the dial cam plate 160. The other arm 284 of the bell crank lever extends rearwardly over the nose of the thrust bar 283, already described. This thrust bar is controlled by the cams on the pattern drum to operate the cutter at each change of the position of any of the regular yarn guides 205, 206, 207 and 208, and finally to sever the yarn or yarns knitting when the stocking is completed to secure the ejection from the machine of the completed stocking.

The cutter is controlled at each operation of the splicing yarn guide by mechanism brought into action with the dropping of the thrust bar 278, controlling the splicing yarn guide, into operative position. For this purpose bar 364 is rigidly connected at 365 to the arm 284 of the bell crank lever extending therefrom laterally to a point above the inner end of the splicing yarn guide 204. A latch 366 is pivoted at 367 to the bar 364 and tends to swing by gravity into a vertical position, its swinging movement being limited by a stop 368 engaging with the bar 364. When the latch 366 is in vertical position and the splicing yarn guide 204 is seated on the throat 193, the bottom of the latch is just over the top of the forward end of the yarn guide. An arm 369 extends rearwardly and downwardly from the latch 366 and along side the thrust bar 278 and co-operates at its lower end with a cam projection 370 on the thrust bar. When the splicing yarn guide is out of operation, the parts stand as shown in Figs. 18 and 23, the latch 366 being cammed aside by the yarn guide 204. When the cam of the pattern cam drum 10 allows the thrust bar 278 to drop to bring the splicing yarn into operation, the parts 278 and 204 stand as shown in Fig. 19, and the latch 366 swings into the position shown in dotted lines in Fig. 23. In this position at each operation of the thrust bar 278 by the cam 348 to raise the yarn guide 204, the latch 366 is raised to operate the cutter. When the splicing yarn guide is thrown out of operation by the cam on the pattern drum, the cam 370 on the thrust bar operates to swing the latch aside until it is caught and cammed by the yarn guide 204 into the position shown in Fig. 23. Thus, a simple and effective means is provided for severing the yarn at each operation of the splicing yarn guide, the yarn being carried first into the clamp 353 and then severed by the cutter.

The several yarns employed run from suitable cops 371 supported at convenient positions in the usual manner on brackets carried by the bed plate or frame of the machine through suitable tension and take-up devices supported by the post 372. As these tension and take-up devices form no part of the present invention, they are not illustrated and they are controlled and operated in a familiar manner by means of the thrust bar 286, controlled by the pattern drum, as already described. These yarns lead from the take-up or tension devices to eyes in the plate 373 and therefrom to the various yarn guides in the usual manner.

The operation of the machine will be apparent without any further detailed description, and it will be seen from the description already given from the various instrumentalities that the machine automatically performs the various operations going to make up in sequence the desired product, and especially a series of complete stockings, each knit from toe to top and provided with a ribbed leg and discharged completed and separate in a continuous series from the machine.

The machine is particularly designed for carrying out the process of making such stockings as described in and made the subject of Patent No. 1,514,623, granted Nov. 11, 1924, and re-issued as No. 15,983, January 13, 1925. Such a typical stocking as made according to this process is diagrammatically illustrated in Fig. 20. In this method the knitting proceeds from the toe to the top of the stocking. Consequently, during the knitting of the plain work of the toe, foot, heel and ankle portions only the cylinder needles are in operation. The change is then made to the ribbed work forming the leg by throwing into action the dial needles. The advantage in thus knitting from the foot to the leg and in thus making the change from plain to ribbed work lies first in that the machines does not at any time throw any cylinder needles out of knitting position to make any form of knitted work. Thus, a larger number of needles are used in ribbed work than are used in making plain work, which is desired in a stocking in order to provide for the necessary greater elasticity of the leg section.

Another important feature is the provision of means for the proper starting of the knitting of each successive stocking. At the beginning of the stocking the toe section is first formed by plain reciprocating knitting. When the stocking is completed, the edges of the toe section are placed on the pins of a looping machine and secured together by well known and familiar operations. It is customary and desirable first, however, to knit a short section of plain circular work, which, as the sewing operation proceeds or after it is finished, is trimmed off. In starting the knitting operation the yarn guide or guides are moved to position the yarn so as to be caught by the cylinder needles, thus to knit the preliminary section of plain circular work or, if such a section is not utilized, the plain reciprocating work forming the toe section. But it is almost impossible in starting the knitting operation on plain work to prevent two or more of the cylinder needles functioning as a single needle and thus producing what are known as double or multiple headers which damage or destroy the web. In this machine the work is begun in each instance by starting the knitting as in ribbed work, that is, by knitting with both the cylinder and dial needles in operation. There is no difficulty in properly feeding the yarn at the start to the needles when both sets of cylinder and dial needles are in action. One or more rounds, as in ribbed work, are accordingly knitted at the start, thus preventing the formation of double headers. The dial needles are then thrown out of action, casting off the loops accumulated thereon, and the knitting continues on plain work, preferably a short section of plain circular work being knitted before the change is made to the plain reciprocating work forming the toe section of the stocking. When the first course or courses are knit as in ribbed work, there may really be no ribbed work formed because of the lack of tension on the web sufficient to secure casting off from the needles in action. Consequently, only a few courses can be knit in this way as some of the stitches will pile up on the needles. During the knitting of these courses, however, the dial needles act to pull the yarn in between the cylinder needles and thus to insure each cylinder needle acting individually in forming the stitch. When the dial needles are thrown out of action, the sinkers place the necessary casting off tension on the web. But these sinkers do not place sufficient tension at the starting on plain work to push the yarn well between the cylinder needles and thus double or multiple headers occur. If for any reason the knitting operation is started with the cylinder needles alone in operation, the double headers formed are eliminated by throwing the dial needles into action and knitting one or more rounds as in ribbed work. Then the dial needles are thrown out of action and the knitting of plain work proceeds as before. The formation of double or multiple headers is thus either prevented or eliminated by the knitting of a preliminary round or rounds of ribbed work.

Referring more particularly to the construction illustrated, the operation of knitting usually begins with both sets of needles in knitting position and all the yarn guides elevated. At this time the grab rod 221, which is moved down during the making of the previous stocking, is being ratcheted up and the machine preferably is running at a comparatively high speed to elevate the grab rapidly. The speed is then preferably changed and one or more of the yarn guides are thrown into knitting position. The yarn is then taken by both sets of needles as in knitting ribbed work. The dial knitting cam is the only one in operation, the bar 180 having been moved to bring the cams to the position illustrated in Fig. 13. One or more rounds are formed in this manner to prevent double headers. There is no casting off tension applied to this portion of the web and, consequently, it forms a more or less irregular mass, some of the stitches being cast off from the needles and some remaining thereon. Before these preliminary rounds are completed, the grab sleeve 219 preferably has reached its uppermost position.

Upon the completion of these preliminary rounds the pattern drum acts to move the bar 180 and shift the positions of the knitting and casting off dial cams to the position shown in Fig. 15, where the knitting cam is retracted, causing the dial needles to recede from knitting position and the casting off cam is projected and as the dial needles reach this cam, the stitches are cast off and all the work is then held by the cylinder needles.

Immediately the dial cams are thus shifted the dial is raised bodily by the movement of the bar 156. Up to the conclusion of the knitting of the short section of plain circular work, which precedes the beginning of the reciprocating work forming the toe, the dial cams remain in the position shown in Fig. 15 and are then immediately shifted to the position shown in Fig. 14, where both are retracted.

The section of cylinder needles provided with the longer butts are now projected out of action and the remaining section of cylinder needles with the shorter butts are successively raised and lowered to narrow and widen the fabric during the knitting of the reciprocating work by the means already described.

During the knitting of the toe, foot, heel and ankle the operations performed and changes made will be readily understood. The grab and the dial remain in elevated position. The yarns are changed as desired. The required tension on the web is produced by the sinkers.

At the completion of the ankle portion the machine knitting changes to ribbed work. The dial needles are projected into action by shifting the cams to the position shown in Fig. 13, the pawl and ratchet mechanism for elevating the grab rod 221 having been released by the bar 228 to permit the grab rod to drop. The grab rod, upon being released, drops independently of the grab fingers and cams the fingers out radially. At the end of this cam operation the sleeve 219, connected to the grab rod, coming into contact with the collar 216, carrying the grab fingers, causes the entire grab mechanism to ride down by gravity hanging on the web and producing the necessary tension.

The joint between the plain and ribbed work may be made in any suitable manner and preferably by first throwing the dial needles into action to receive one round of stitches, then retracting the dial needles, knitting one or more rounds on the cylinder needles and then projecting the dial needles into action again.

The length of the ribbed work, as already pointed out, is determined by the extent of travel of the grab, as already described. When the machine passes to ribbed work the cam 204 on the pattern cam drum causes the cessation of movement of the pattern chain 43. When the required length of ribbed work has been reached, determined by the position at which the disk 245 is set, this disk, contacting with the lever 246, acts to restore the pattern chain into action.

At the conclusion of the knitting all the yarn fingers in action are raised by the drum, the yarn running therefrom is carried under the spring clamp and then between the shearing blades of the cutter, and the cutter is actuated from the drum to sever the yarn and immediately the stocking is knit off, being then or previously caught by the feed rolls 263 and 264 and discharged from the machine.

As soon as the stocking is knit off, the ratchet mechanism for elevating the grab is returned to action and the ratcheting of the grab to uppermost position begins with the machine speeded up.

It is desirable when knitting plain work to raise the dial above its position for ribbed work, first, to enable the web to pass freely between the dial and the cylinder, especially because of the toe and heel pockets, and second, to insure the fingers of the grab taking hold of the web above the heel pocket and thus producing an even casting off tension all around the web. The dial is dropped to its lower position at the same time the grab rod is dropped at the time of the change from plain to ribbed work.

The length of stitch is varied from time to time by raising and lowering the cylinder in the manner described, and all the various other changes desirable or necessary are automatically controlled from the pattern chain and pattern drum in a manner that will be apparent.

Having fully described my invention, what I claim as new and desire to secure by Letters Patent is:

1. A circular knitting machine comprising two sets of needles, non-revoluble operating cams therefor, revoluble needle beds for said sets of needles and means for revolving them, means for causing the operation of said needles to produce either ribbed, plain circular or reciprocating work as desired, pattern controlled means for controlling the change from plain to ribbed work and from ribbed to plain work, and means for suspending the operation of said pattern controlled means after a predetermined change from plain to ribbed work and for restoring the operation of said pattern controlled means upon the completion of the knitting of a predetermined measured length of ribbed work.

2. A circular knitting machine comprising two sets of needles, non-revoluble operating cams therefor, revoluble needle beds for said sets of needles and means for revolving them, means for causing the operation of said needles to produce either ribbed, plain circular or reciprocating work as desired, pattern controlled means for controlling the change from plain to ribbed work and from ribbed to plain work, a grab take-up interiorly engageable with the work being knit and revoluble therewith, means for throwing the grab take-up into engagement with the work to travel therewith during the knitting of ribbed work, means for suspending the operation of said pattern controlled means when the change is made from plain to ribbed work, and means controlled by the grab take-up for causing the resumption of operation of said pattern controlled means whereby the length of ribbed work knit is determined by the movement of the grab take-up.

3. A circular knitting machine comprising two sets of needles, non-revoluble operating cams therefor, revoluble needle beds for said sets of needles and means for revolving them, means for causing the operation of said needles to produce either ribbed, plain circular or reciprocating work as desired, pattern controlled means for controlling the change from plain to ribbed work and from ribbed to plain work, a pattern drum, a driven member driving the pattern drum, a pattern chain movable with the driven member, means for driving the driven member, an indicator on the pattern drum acting to suspend the operation of said driving means and therewith the movement of said chain, and means for restoring the operation of said driving means upon the completion of a predetermined length of ribbed work.

4. A circular knitting machine comprising two sets of needles, non-revoluble operating cams therefor, revoluble needle beds for said sets of needles and means for revolving them, means for causing the operation of said needles to produce either ribbed, plain circular or reciprocating work as desired, pattern controlled means for controlling the change from plain to ribbed work and from ribbed to plain work, a pattern drum, a driven member driving the pattern drum, a pattern chain movable with the driven member, means for driving the driven member, an indicator on the pattern drum acting to suspend the operation of said driving means and therewith the movement of said chain, a grab take-up engageable and revoluble with the work being knit, means for throwing the grab take-up into engagement with the work to travel therewith during the knitting of ribbed work, and means controlled by the grab for restoring the operation of said driving means upon the completion of a predetermined length of ribbed work.

5. A circular knitting machine comprising two sets of needles, non-revoluble operating cams therefor, revoluble needle beds for said sets of needles and means for revolving them, means for causing the operation of said needles to produce two kinds of work as desired, automatically controlled means for controlling the change from one kind of work to the other, a grab take-up interiorly engageable with the work being knitted and revoluble therewith, means for throwing the grab take-up into engagement with the work to travel therewith during the knitting of one kind of work, means for suspending the operation of said automatically controlled means when the change is made from one kind of work to the other, and means controlled by the grab take-up for causing the resumption of operation of said automatically controlled means whereby the length of the one kind of work knitted is determined by the movement of the grab take-up.

6. A circular knitting machine comprising two sets of needles, non-revoluble operating cams therefor, revoluble needle beds for said sets of needles and means for revolving them, means for causing the operation of said needles to produce two kinds of work as desired, automatically controlled means for controlling the change from one kind of work to the other, a grab take-up interiorly engageable with the work being knitted and revoluble therewith, means for throwing the grab take-up into engagement with the work to travel therewith during the knitting of one kind of work, and means for determining the length of the said one kind of work knitted by the movement of the grab take-up.

7. A circular knitting machine comprising two sets of needles, non-revoluble operating cams therefor, revoluble needle beds for said sets of needles and means for revolving them, means for causing the operation of said needles to produce either plain work or ribbed work as desired, a grab take-up interiorly engageable with the work being knitted and revoluble therewith, means for throwing the grab take-up into and out of engagement with the work, the said grab take-up travelling with the work when in engagement therewith, automatic means controlled by the number of courses effecting the change from one kind of work to another, and means to cause either the said automatic means or the grab take-up as desired to control the change from one kind of work to another whereby the length of the kind of work made may be determined either by the number of courses or by the length of movement of the grab take-up.

8. A circular knitting machine comprising a set of needles, non-revoluble operating cams therefor, a revoluble needle bed for said set of needles and means for revolving it, a grab take-up interiorly engageable with the work being knitted and revoluble therewith, means for throwing the grab take-up into engagement with the work to travel therewith and means for determining the length of work knitted either by the number of courses or by the movement of grab take-up in engagement therewith.

9. A knitting machine comprising two sets of needles, non-revoluble operating cams therefor, revoluble needle beds for said sets of needles, means for giving continuous revolving movement to said beds to produce circular work and for giving oscillatory revolving movement to one set to produce reciprocating work, and pattern controlled means to cause said needles to knit a continuous series of work sections, each section comprising in the following sequence: plain circular work and ribbed work, and to separate the successive work sections and discharge them successively from the machine.

10. A knitting machine comprising a revoluble cylinder and a set of cylinder needles therein and non-revoluble cams therefor, a revoluble dial and a set of dial needles therein and non-revoluble cams therefor, pattern controlled mechanism for controlling the operation of said needles to produce either ribbed, plain circular or reciprocating work as desired and means for raising the dial with respect to the cylinder after the completion of ribbed work.

11. A knitting machine comprising a revoluble cylinder and a set of cylinder needles therein and non-revoluble cams therefor, a revoluble dial and a set of dial needles therein and non-revoluble cams therefor, pattern controlled mechanism for controlling the operation of said needles to produce either ribbed, plain circular or reciprocating work as desired, and means for raising the dial with respect to the cylinder upon the change from ribbed to plain work and for maintaining it in raised position during the knitting of plain work.

12. A knitting machine comprising a revoluble cylinder and a set of cylinder needles therein and non-revoluble cams therefor, a revoluble dial and a set of dial needles therein and non-revoluble cams therefor, pattern controlled mechanism for controlling the operation of said needles to produce either ribbed, plain circular or reciprocating work as desired, a revolving grab take-up interiorly engageable with the work being knitted and mounted for axial reciprocating movement within the cylinder, means for automatically elevating the grab take-up to starting position upon the conclusion of the knitting of a section of ribbed work, and means for releasing the grab take-up into engagement with the work at or prior to the change from plain to ribbed knitting.

13. A circular knitting machine comprising two sets of needles, non-revoluble operating cams therefor, revoluble needle beds for said sets of needles and means for revolving them, means for causing the operation of said needles to produce either ribbed, plain circular, or reciprocating work as desired, pattern controlled means for changing from one kind of work to another, and means engaging and revoluble with the work for changing from one kind of work to another upon completion of a predetermined measured length, the said pattern controlled means and the said engaging means acting independently, whereby the length of the work being knit is controlled either by the number of courses or by absolute measurement.

14. A circular kntting machine comprising a set of needles, non-revoluble operating cams therefor, a revoluble needle bed for said set of needles and means for revolving it, a grab take-up interiorly engageable with the work being knitted and revoluble therewith, means for throwing the grab take-up into engagement with the work to travel therewith, means for determining the length of work knitted either by the number of courses or by the movement of the grab take-up in engagement therewith, and means for automatically changing the yarns during a length of work determined by the number of courses knit.

15. A circular knitting machine comprising a set of needles, non-revoluble operating cams therefor, a revoluble needle bed for said set of needles and means for revolving it, a grab take-up interiorly engageable with the work being knitted and revoluble therewith, means for throwing the grab take-up into engagement with the work to travel therewith, means for determining the length of work knitted either by the number of courses or by the movement of the grab take-up in engagement therewith, and means for automatically changing the yarn upon the change to, or from, or during, a length of work determined by the number of courses knit.

16. A knitting machine comprising two sets of needles, non-revoluble operating cams therefor, revoluble needle beds for said sets of needles, means for giving continuous revolving movement to said beds to produce circular work and for giving oscillatory revolving movement to one set to produce reciprocating work, pattern controlled means to cause said needles to knit a continuous series of work sections, each section comprising in the following sequence: plain circular work, and ribbed work, a grab take-up interiorly engageable with the work being knit and revoluble therewith, means for throwing the grab take-up into engagement with the work to travel therewith and means for determining the length of work knit either by the number of courses or by the movement of the grab take-up in engagement therewith.

In testimony whereof, I have signed my name to this specification.

PATRICK P. LA MONTAGNE.